(12) United States Patent
Nduka et al.

(10) Patent No.: US 11,538,279 B2
(45) Date of Patent: Dec. 27, 2022

(54) OPTICAL EXPRESSION DETECTION

(71) Applicant: EMTEQ LIMITED, Brighton (GB)

(72) Inventors: Charles Nduka, Brighton (GB);
Andrew Cleal, East Sussex (GB);
James Archer, East Sussex (GB);
Mohsen Fatoorechi, East Sussex (GB)

(73) Assignee: EMTEQ LIMITED, Brighton (GB)

( * ) Notice: Subject to any disclaimer, the term of this patent is extended or adjusted under 35 U.S.C. 154(b) by 44 days.

(21) Appl. No.: 17/316,399

(22) Filed: May 10, 2021

(65) Prior Publication Data

US 2021/0271861 A1  Sep. 2, 2021

Related U.S. Application Data

(63) Continuation of application No. 16/489,327, filed as application No. PCT/GB2018/050511 on Feb. 27, 2018, now Pat. No. 11,003,899.

(30) Foreign Application Priority Data

Feb. 27, 2017 (GB) ..................................... 1703133

(51) Int. Cl.
*G06V 40/16* (2022.01)
*G06V 10/147* (2022.01)
(Continued)

(52) U.S. Cl.
CPC ......... *G06V 40/176* (2022.01); *G02B 27/017* (2013.01); *G06F 21/32* (2013.01);
(Continued)

(58) Field of Classification Search
None
See application file for complete search history.

(56) References Cited

U.S. PATENT DOCUMENTS 4,364,035 A   12/1982  Kirsch
4,906,837 A   3/1990   Doneen et al.
(Continued)

FOREIGN PATENT DOCUMENTS

WO   WO2005065407 A2   7/2005
WO   WO2016/165052   * 10/2016
(Continued)

OTHER PUBLICATIONS

May 27, 2022 European Search Report issued in European Patent Application No. 22157345.4.
(Continued)

*Primary Examiner* — Christopher Braniff
(74) *Attorney, Agent, or Firm* — Kenealy Vaidya LLP

(57) ABSTRACT

Some embodiments are directed to a biometric authentication system including headwear having a plurality of biosensors each configured to sample muscle activity so as to obtain a respective time-varying signal, a data store for storing a data set representing characteristic muscle activity for one or more users, and a processor configured to process the time-varying signals from the biosensors in dependence on the stored data set so as to determine a correspondence between a time-varying signal and characteristic muscle activity of one of the one or more users, and in dependence on the determined correspondence, authenticate the time-varying signals as being associated with that user.

20 Claims, 15 Drawing Sheets

(51) Int. Cl.
  *G02B 27/01* (2006.01)
  *G06F 21/32* (2013.01)
  *G06V 40/20* (2022.01)
  *G06V 40/70* (2022.01)

(52) U.S. Cl.
  CPC .......... *G06V 10/147* (2022.01); *G06V 40/166* (2022.01); *G06V 40/167* (2022.01); *G06V 40/20* (2022.01); *G06V 40/70* (2022.01); *G02B 2027/0178* (2013.01)

(56) References Cited

U.S. PATENT DOCUMENTS

| | | |
|---|---|---|
| 9,013,264 B2 | 4/2015 | Parshionikar et al. |
| 2007/0273611 A1 | 11/2007 | Torch |
| 2012/0229248 A1 | 9/2012 | Parshionikar et al. |
| 2014/0078049 A1 | 3/2014 | Parshionikar |
| 2015/0157255 A1 | 6/2015 | Nduka |
| 2019/0101977 A1 | 4/2019 | Armstrong-Muntner et al. |

FOREIGN PATENT DOCUMENTS

| | | |
|---|---|---|
| WO | WO2016156149 A1 | 10/2016 |
| WO | WO2016165052 A1 | 10/2016 |
| WO | WO2017006872 A1 | 1/2017 |
| WO | WO2017156570 A1 | 9/2017 |
| WO | WO2018069789 A1 | 4/2018 |

OTHER PUBLICATIONS

Jun. 7, 2022 Search Report issued in corresponding Great Britain Application No. 2207049.4.

Jul. 10, 2018 International Search Report (ISR) issued in International application No. PCT/GB2018/050511.

Jul. 10, 2018 Written Opinion of the International Searching Authority (ISR) issued in International application No. PCT/GB2018/050511.

Muhammed, et al., "Optomyography (OMG): A Novel Technique for the Detection of Muscle Surface Displacement Using Photoelectric Sensors," School of Technology and Health STH, Royal Institute of Technology KTH Stockholm, Sweden, 4 pgs.

Olszewski, et al., "High-Fidelity Facial and Speech Animation for VR HMDs," SA '16 Technical Papers, Dec. 5-8, 2016, Macao, 14 pgs.

Valstar, et al., "Fully Automatic Facial Action Unit Detection and Temporal Analysis," Proceedings of the 2006 Conference on Computer Vision and Pattern Recognition Workshop (CVPRW'06), 8 pgs.

Masai, et al., "AffectiveWear: Toward Recognizing Facial Expression," Siggraph 2015 Posters, Aug. 9-13, 2015, Los Angeles, CA, 1 page.

Masai, et al., "Evaluation of Facial Expression Recognition by A Smart Eyewear for Facial Direction Changes, Repeatability and Positional Drift," ACM Transactions on Interactive Intelligent Systems, vol. 9, No. 4, Article 39, Pub. date: Mar. 2017, pp. 1-22.

Graham, et al., "Measurement-Based Synthesis of Facial Microgeometry," EuroGraphics 2013 / I. Navazo, P. Poulin, vol. 32 (2013), No. 2, 10 pgs.

Melo Da Silva, et al., "Optical mouse acting as biospeckle sensor," Elsevier, Optics Communications 284 (2011) pp. 1798-1802.

Bartlett, et al., "Real Time Face Detection and Facial Expression Recognition: Development and Applications to Human Computer Interaction," Proceedings of the 2003 Conference on Computer Vision and Pattern Recognition Workshop (CVPRW'03), 6 pgs.

Kimura, et al., "Prototype Glasses-type Device with Videophone Capabilities-Hands-free Videophone." NTT Docomo Technical Journal vol. 15 No 3, pp. 10-16.

\* cited by examiner

OPTICAL EXPRESSION DETECTION

CROSS REFERENCE TO RELATED APPLICATIONS

This application claims priority to and is a continuation patent application of U.S. patent application Ser. No. 16/489,327 filed on Aug. 27, 2019 for which a Notice of Allowance was issued on Jan. 13, 2021, which is a national phase filing under 35 C.F.R. § 371 of and claims priority to PCT Patent Application No. PCT/GB2018/050511, filed on Feb. 27, 2018, which claims the priority benefit under 35 U.S.C. § 119 of British Patent Application No. 1703133.7, filed on Feb. 27, 2017, the contents of each of which are hereby incorporated in their entireties by reference.

BACKGROUND

Some embodiments relate to a system including wearable apparatus for detecting facial muscle activity and wearable apparatus for detecting facial skin movement.

Various approaches have been described for detecting the activity of facial muscles. Typically such approaches involve the processing of video streams which capture the whole face using one or more cameras. For example, Real Time Face Detection and Facial Expression Recognition: Development and Applications to Human Computer Interaction, Bartlett et al., Proceedings of the 2003 Conference on Computer Vision and Pattern Recognition Workshop, IEEE, 2003 describes processing video frames depicting a user in order to identify the facial expressions of the user. The system does not however determine the component muscle activities from the video stream. Such camera-based systems also may require a significant amount of processing power (at a level which is typically infeasible to be performed at a mobile battery-powered device) and do not allow the user to move around freely (since the user's face must or should remain in view of the camera).

It has been proposed to mount cameras on a pair of glasses so as to allow hands-free video capture whilst the user is on the move: Prototype Glasses-type Device with Videophone Capabilities—Hands-free Videophone, NTT DOCOMO Technical Journal, Vol. 15, No. 3. However, such an approach may require processing of the close-up images captured by fish-eye cameras in order to form a complete view of the face.

US Patent Publication No. 2012/0229248 describes a system for detecting facial expression using proximity sensors mounted on a pair of glasses to detect the activity of facial muscles. This approach relies on a facial muscle creating a measurable displacement of the skin overlying the muscle as the muscle contracts and relaxes. The sensitivity of such a system is poor since generally a large muscle activation may be required to create a measurable change in proximity between skin and sensor, and the system is unreliable because even small movements of a pair of glasses relative to the face (e.g. as a user moves about) can exceed the size of the skin displacements being measured. A similar system using photoreflective sensors is described in AffectiveWear: Toward Recognizing Facial Expression, K. Masai et al., SIGGRAPH 2015 Posters, Aug. 9-13, 2015, Los Angeles.

Other forms of optical skin tracking have been described in other fields. For example, PCT Application WO 2005/065407 describes a position tracking device for use at the skin for precise treatment delivery (e.g. precise location of an injectable drug or radiation therapy) or 3D scanning of the human body. And Optical mouse acting as biospeckle sensor, M. Melo da Silva et al., Optics Communications 284, 1798-1802, 2011 describes monitoring the displacement of the skin overlying the radial artery by a laser directed to a small paper sticker glued to the skin overlying the radial artery.

SUMMARY

Some embodiments provide a system for detecting facial muscle activity including:
wearable apparatus including a plurality of optical flow sensors each located so as to, in use when the apparatus is worn, image an area of skin associated with one or more facial muscles, each optical flow sensor being configured to capture time-varying data describing movement of the respective area of skin substantially in the plane of the imaged area of skin; and
a processor configured to process the time-varying data in dependence on a predetermined dataset relating facial muscle activity to movement of the areas of skin so as to determine activity of the set of facial muscles.

The one or more of the plurality of optical flow sensors may be located at the wearable apparatus so as to, in use when the apparatus is worn, image an area of skin overlying or adjacent to an insertion point of at least one of the one or more associated facial muscles.

The time-varying data may include one or more of: vector information describing the magnitude and direction of movement of the area of skin; and a time series of images of the area of skin.

The time-varying data may include a time series of images and the processor may be configured to process the time-varying data by identifying changes in texture in the images indicative of facial muscle activity according to the predetermined dataset.

The processor may be configured to determine activation of a facial muscle associated with an area of skin when the magnitude of movement of the area of skin in a predefined direction exceeds a predetermined threshold.

The processor may be further configured to determine a degree of activation of the facial muscle in dependence on the magnitude of movement of the area of skin in a predefined direction in excess of the predetermined threshold.

The processor may be configured to collectively process time-varying data from the plurality of optical flow sensors so as to determine facial expression of the wearer of the wearable apparatus.

The processor may be configured to identify a facial expression when the magnitude and direction of movement detected at each of one or more of the optical flow sensors matches within predefined bounds a respective stored magnitude and direction of movement for each of those optical flow sensors for that facial expression.

The processor may be configured to, on identifying that two or more of the plurality of optical flow sensors capture substantially similar skin movements in both magnitude and direction, not determine a facial expression of the wearer of the wearable apparatus.

The processor may be configured to not provide an output representing the facial muscle activity of the wearer.

The dataset may include parameters for a model relating muscle activity to time-varying data.

The model may be a model generated using a machine learning algorithm.

The processor may be configured to process the determined activity of the set of facial muscles so as to infer facial expression of the wearer of the wearable apparatus.

The processor may be provided at one or more of: the wearable apparatus and a device external to the wearable apparatus and configured to receive the time-varying data by a wired or wireless connection.

The wearable apparatus may further include one or more lenses adapted to, in use when the apparatus is worn, focus light reflected from an area of skin onto the respective optical flow sensor.

One or more of the optical flow sensors may include a diffraction grating adapted to create a known diffraction pattern on the sensor so as to enable lens-less image capture.

The wearable apparatus may include one or more light sources arranged to illuminate the areas of skin.

The one or more light sources may be adapted to illuminate the areas of skin with non-visible light.

The one or more light sources may be one or more lasers suitable for use at human skin.

At least one of the one or more light sources may be substantially monochromatic and the one or more respective optical flow sensors include a filter for its light sensor adapted to preferentially or advantageously pass light of the colour emitted by the light source.

One of more of the plurality of optical flow sensors may be configured to receive light reflected from the respective area of skin through a plane-polarized filter oriented such that, in use when the apparatus is worn, the plane of polarization of the filter is substantially parallel to the plane of the area of skin.

The optical flow sensors and any optical elements in the light path between an area of skin and the respective optical flow sensors may be arranged so as to not contact the skin when the apparatus is worn.

The wearable apparatus may further include one or more first mirrors each configured to direct light reflected from the skin to an optical flow sensor.

The wearable apparatus may further include one or more second mirrors each configured to direct light from a light source to the skin so as to illuminate the skin.

For at least some of the optical flow sensors and light sources, the first and second mirrors are one and the same mirror.

The areas of skin imaged by the optical flow sensors may be no larger than 20 square millimetres, preferably or advantageously no larger than 15 square millimetres, and most preferably or advantageously no larger than 10 square millimetres.

The number of areas of skin imaged by the plurality of optical flow sensors may exceed the number of optical flow sensors and one or more of the plurality of optical flow sensors may be configured to receive light from a plurality of areas of skin over one or more optical fibers.

The wearable apparatus may further include an optical switch configured to alternately provide light received from each of at least two of the plurality of areas of skin to an optical flow sensor, the optical switch being synchronised with the sampling rate of the optical flow sensor such that the optical flow sensor is configured to alternately sample different areas of skin.

The optical switch may include one or more liquid crystal filters operable to alternately pass light received from each of at least two of the plurality of areas of skin to the optical flow sensor.

The wearable apparatus may include a single light source and one or more optical fibers arranged to transmit light from the light source to each of the plurality of areas of skin, each of the optical flow sensors not including a light source configured to illuminate an area of skin.

The wearable apparatus may further include one or more motion sensors and the processor is configured to filter the time-varying data describing movement of the respective areas of skin in dependence on the output of the one or more motion sensors.

The processor may be configured to filter the time-varying data from an optical flow sensor by subtracting a vector derived from the one or more motion sensors from the time-varying data including vector information describing the magnitude and direction of movement of the area of skin.

The processor may be configured to not provide an output representing the facial muscle activity of the wearer when the one or more motion sensors indicate movement of the apparatus which exceeds some predefined magnitude.

One or more of the optical flow sensors may be pivotally coupled to a housing of the wearable apparatus so as to enable control of the area of skin sampled by such optical flow sensors.

The plurality of optical flow sensors my include an optical flow sensor arranged at the wearable apparatus so as to detect movement of an area of skin on or below the supraorbital ridge and the processor is configured to interpret elevation of that area of skin as activation of the frontalis muscle.

In use, no part of the wearable apparatus may overlie the frontalis muscle.

The system may further include an EMG sensor and/or a proximity sensor arranged to detect the activity of a first muscle along with one of the plurality of optical flow sensors, and the processor may be configured to combine, with the time-varying data captured by the optical flow sensor, time-varying data describing movement of the respective area of skin which is captured by the EMG sensor and/or the proximity sensor.

At a given point in time, the processor may be configured to weight the time-varying data captured by the sensors according to the level of activity of the first muscle indicated one or more of the sensors.

The processor may be configured to preferentially or advantageously weight the time-varying data captured by the EMG sensor at low activity levels of activity of the first muscle and the optical flow sensor at intermediate levels of activity of the first muscle.

The processor may be configured to preferentially or advantageously weight the time-varying data captured by the proximity sensor at high activity levels of activity of the first muscle and the optical flow sensor at intermediate levels of activity of the first muscle.

The optical flow sensor may be arranged at the wearable apparatus so as to be directed to an area of skin overlying an antagonistic muscle to the first muscle, and one or both of the EMG and proximity sensors are arranged at the wearable apparatus so as to be directed to an area of skin overlying the first muscle.

The optical flow sensors may be located at the wearable apparatus so as to, in use when the apparatus is worn, image an area of skin at least partially overlying one or more of the following facial muscles: frontalis; zygomaticus; orbicularis occuli; orbicularis oris; depressor supercilii; procerus; corrugator supercilii; and levator labii.

Some other embodiments provide wearable apparatus for detecting facial skin movement including a plurality of optical flow sensors each located so as to, in use when the apparatus is worn, image an area of skin associated with one or more facial muscles, each optical flow sensor being configured to capture time-varying data describing movement of the respective area of skin substantially in the plane of the imaged area of skin.

Each optical flow sensor may be arranged at the wearable apparatus such that, in use on activation of the associated one or more facial muscles, movement of the respective area of skin is predominantly transverse to the direction of image capture.

Each optical flow sensor may be arranged to detect movement transverse to its direction of image capture.

BRIEF DESCRIPTION OF THE DRAWINGS

Some embodiments will now be described by way of example with reference to the accompanying drawings. In the drawings.

DETAILED DESCRIPTION

The following description is presented by way of example to enable a person of ordinary skill in the art to make and use some embodiments. Some embodiments are not limited to the embodiments described herein and various modifications to the disclosed embodiments will be apparent to those with ordinary skill in the art.

There is a need for a convenient and accurate system for detecting facial muscle activity which can be provided as a low power, portable system that can be used whilst the user is moving about.

The skin's surface anatomy and micro-relief is unique and affected by both genetic (e.g. pigmentation, hair follicles, sebaceous pores, congenital lesions), environmental (e.g. sun spots, sun tanning) and localised factors (e.g. scars, infections and inflammation). Fine furrows intersect with each other, forming many types of shapes including especially triangles, and rhomboids, but also squares, rectangles, and trapezoids that contribute to the skin's glyphic patterns. The latter provide the skin with the flexibility that may be required to allow various ranges of motion, particularly in mobile areas such as around joint regions. Skin wrinkles are different from glyphic patterns; wrinkles are largely genetically determined and develop over time as a result of underlying muscular activity and dermal matrix deterioration. There are also passive skin wrinkles that occur due to repeated creasing of the skin, such as occur whilst sleeping (sleep lines).

Due to the combination of skin surface anatomy, glyphic patterns and wrinkles, the skin represents a non-uniform surface microstructure with varied reflectance. This enables highly accurate tracking of localised skin surface movements to be performed by suitable optical tracker. The presently disclosed subject matter have appreciated that the activity of many facial muscles can be inferred from the localised movement of skin overlying or adjacent to those muscles. The presently disclosed subject matter disclose a system and wearable apparatus including a plurality of optical flow sensors arranged to detect facial muscle activity from the movement of skin associated with the facial muscles and hence enable the determination of facial expression.

Optical flow sensors are capable of visually sampling a surface (in this case skin) and comparing samples captured apart in time so as to detect movement of the surface relative to the sensor between those points in time. A visual sample captured by an optical flow sensor may be any kind of representation of the surface (e.g. a photograph) or representation of light modified by the surface (e.g. an interference pattern or speckle pattern created by the surface interacting with a laser directed at the surface). Suitable optical flow algorithms may be used to track changes between visual samples which represent movement of the sampled surface.

Figure 1:
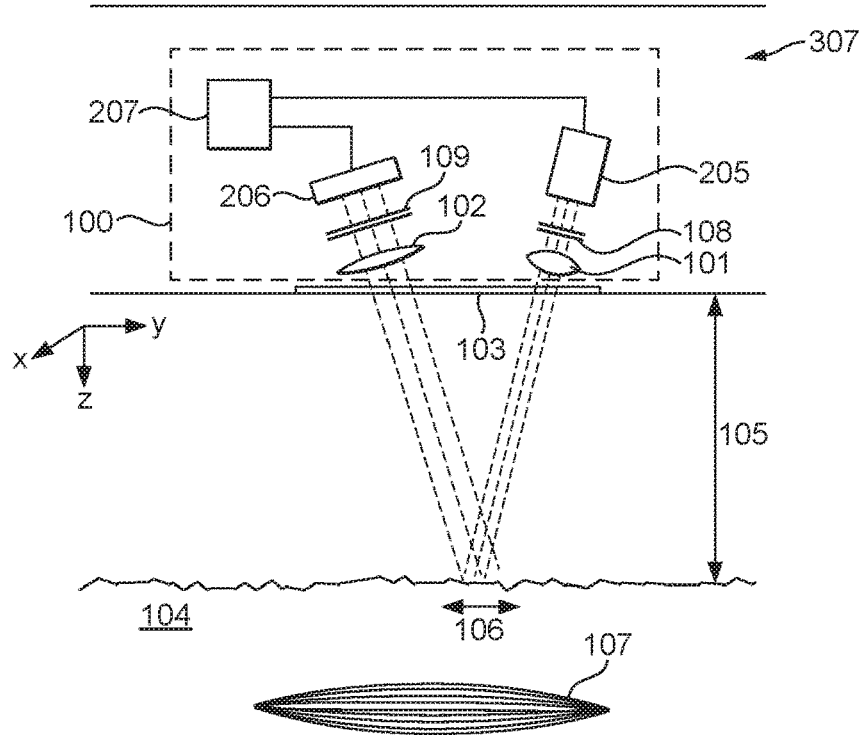
FIG. 1 is a schematic diagram of an optical flow sensor in-situ within a housing and configured for detecting skin movement resultant from muscle activity.

An optical flow sensor 100 is shown in FIG. 1. The optical flow sensor includes a light source 205, a light sensor 206, and a processor 207 for processing the output of the light sensor so as to determine relative movement between the sensor 100 and the skin 104. The light source 205 is arranged to illuminate the patch of skin 104 whose movement is to be detected. The light source may be, for example, an LED or laser. A suitable lens 101 may be provided in the light path so as to, for a given distance 105 from the sensor to the skin, focus the light onto a patch of skin of suitable size which is to be imaged. Similarly, a suitable lens 102 may be provided in the reflected light path so as to, for a given distance 105 from the sensor to the skin, focus the reflected light onto the light sensor 206. Processor 207 may be configured to capture skin movement transverse to the imaging direction of the optical flow sensor using suitable optical flow algorithms configured to track movement of a surface. Optical flow algorithms of the type used in optical computer mice to track the relative movement of the mouse over a surface can be suitable.

Preferably or advantageously lens 101 is a collimating lens so as to avoid the size of the illuminated area and the effective intensity of the light incident at the skin varying significantly as the distance between the skin and optical flow sensor varies. Lens 102 is preferably or advantageously an imaging lens selected so as to focus the reflected light from the patch of illuminated skin at the light sensor 206 and allow the light sensor to capture the texture of the skin. One or both of lenses 101 and 102 may be replaced or augmented by a diffraction grating. Processor 207 may be configured to perform suitable computational algorithms optimized to detect optical flow of the skin 104 given the pattern created at the image sensor by the diffraction grating(s). A diffraction grating may be integrated with image sensor 206 in order to provide a compact imaging unit. For example, the image sensor 206 may be a Rambus Lensless Smart Sensor.

The light sensor may be, for example, a Charge Coupled Device (CCD) or a Complementary Metal-Oxide-Semiconductor (CMOS) sensor.

It can be further be advantageous to provide one or both of filters 108 and 109 in the light path from the light source to the skin, and from the skin to the light sensor, respectively. Filter 108/109 could be any suitable kind of filter, such as a polarising filter and/or a colour filter. For example, filters 108 and 109 could both be polarising filters arranged to apply the same polarisation to the light passing through the filter. This arrangement can help the sensor to distinguish light which originated from the light source and was reflected from the skin from ambient light. In a second example, filter 109 could be a polarizing filter oriented so as to pass plane-polarised light reflected from skin 104 and attenuate light having other polarisations. Typically reflected light is at least partially plane-polarized with a direction of polarization parallel to the reflecting surface; the corresponding direction of polarization can be selected for a plan polarizing filter 109. This can help to isolate reflected light from ambient light. In this second example, a filter 108 may additionally be provided as either a polarizing filter whose axis of polarization is substantially oriented at 90 degrees to filter 108 (i.e. cross-polarised with respect to filter 109) or plane-polarized with a direction of polarization substantially parallel to the reflecting surface.

The optional filters 108, 109 may be coloured filters arranged to pass frequencies of light which are particularly advantageous for imaging skin and/or rejecting ambient light. Filter 108 may be employed to provide substantially monochromatic illumination if light source 205 emits a broad spectrum of colours. In the event that light source 205 is monochromatic (whether alone or when combined with filter 108), filter 109 may be a filter arranged to preferentially or advantageously pass light of that colour so as to reject ambient light of other colours. This can help the optical flow sensor to isolate changes in the light received at the light sensor due to movement of the skin from changes in environmental lighting conditions at the skin (e.g. due to a user wearing a device including an optical flow sensor moving about relative to a set of environmental light sources). This is particularly relevant to examples described herein where the distance from the skin to the optical flow sensor is several millimetres and shrouding is not provided to shield the area of skin being sampled by the optical flow sensor from environmental light. Infra-red light is particularly advantageous for imaging skin and avoids the skin of the user being visibly illuminated by the optical flow sensors.

Filters 108, 109 may be integrated with the light source and light sensor, respectively. Additionally or alternatively, filters 108, 109 may be integrated with lenses 101 and 102, respectively. Lenses 101 and 102 may be provided as a single piece into which optional filters 108 and/or 109 may be integrated. In the event that the light source 205 is a laser, the laser itself may be polarized—a further polarizing filter may or may not be required to produce light of a desired polarization.

In some embodiments, one or both of lenses 101 and 102 may be adjustable so as to enable optimal performance to be maintained over a range of distances 105 between the optical flow sensor 100 and skin 104. For example, lens 102 may have a variable focal length so as to accommodate a range of distances 105 whilst ensuring fine detail illuminated at the skin is captured at light sensor 206. Typically, however, it is possible to achieve good performance over a range of distances 105 (e.g. several millimetres for a distance of around 5 mm) with a fixed focal length lens 102.

A window 103 may be provided within the housing in which the optical flow sensor is located. In FIG. 1, the housing is shown by way of example as the frame of the glasses shown in FIG. 3. The window is preferably or advantageously transparent to the frequency of light emitted by light source 205. The window may support a coating designed to prevent reflection of the colour of light emitted by light source 205. Preferably or advantageously the window is one and the same as the lenses 101, 102; additionally or alternatively the window may include the filters 108, 109.

In a preferred or advantageous embodiment, light source 205 is a laser. The coherent nature of laser light is particularly suitable for revealing fine detail in the skin and hence allowing accurate tracking skin movements. The laser could be a vertical-cavity surface-emitting laser (VCSEL) which offers a compact, low power light source suitable for use in a battery-powered device.

An optical flow processor 207 is configured to process signals from light sensor 206 so as to provide an output representative of movement 106 of the skin 104 in the x, y plane due to one or more associated facial muscles 107. The x,y plane is predominantly transverse to the direction of image capture along the z-axis. The "optical flow" of skin movements is thus transverse to the direction of image capture by an optical flow sensor. The optical flow processor 207 may further control the illumination of the skin by a light source 205. Optical flow processor 207 and the light sensor 206 may be provided as a single integrated circuit. The light sensor 206 may be configured to capture an array of pixels, e.g. a 16×16 array, 18×18 or 30×30 array of pixels. A resolution at the skin of around 0.1 mm has been found to offer good performance —this can be achieved by providing a suitable number of pixels and a suitable lens 102 given the sensor-skin distance 105.

In alternative embodiments the light sensor 206 may include a single pixel and lens 102 may include or be an optical element configured to randomize the light passing through it and onto the single pixel sensor (e.g. by a suitable translucent material or a randomizing array of mirrors). Processor 207 or another processor (e.g. 208 or at a computer system) may include suitable computational algorithms configured to generate a representation of the surface of skin 204 from the light incident at the single pixel sensor.

The light sensor may be a monochromatic sensor in that the pixels of the light sensor do not distinguish between different colours of light. The light sensor is preferably or advantageously configured to be preferentially or advantageously sensitive to light lying within a frequency band which includes the colour emitted by light source 205.

The optical flow processor 207 may be configured to sample the light sensor 206 at some predefined rate (e.g. around 1000-1200 Hz, around 10 kHz, or at some other suitable sampling rate) so as to generate a image data representing the sampled area of skin to which the optical flow sensor is directed. Lower sampling rates may reduce the sensitivity of the system or may require a larger area of skin to be imaged in order to detect fast movements of the skin. The image data may be expressed in any suitable manner and need not include complete raster images—for example, image data may include interlaced or otherwise encoded images, or data in any form including contrast at the sampled area of skin. By processing image data (e.g. comparing images within a sequence) it is possible to identify the movement of features through the frame of view captured by the light sensor. The optical flow processor may be configured to perform any suitable optical flow algorithm for tracking contrast features identified at the skin.

Figure 5:
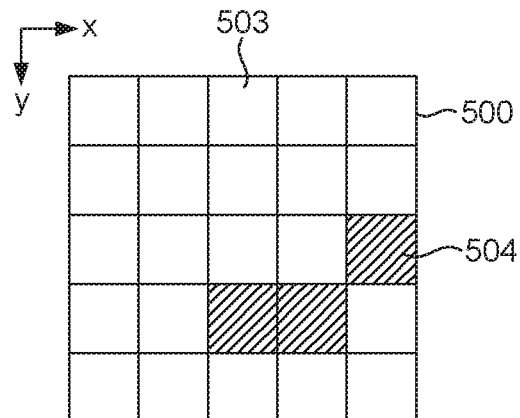
FIG. 5 illustrates movement detection in a set of images captured by an optical flow sensor.
Figure 5:
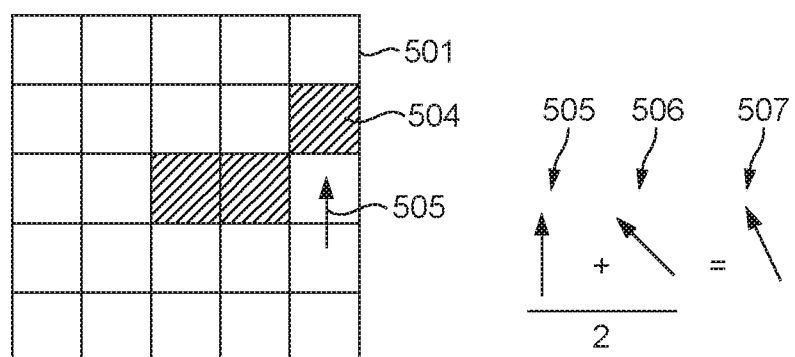
Figure 5:
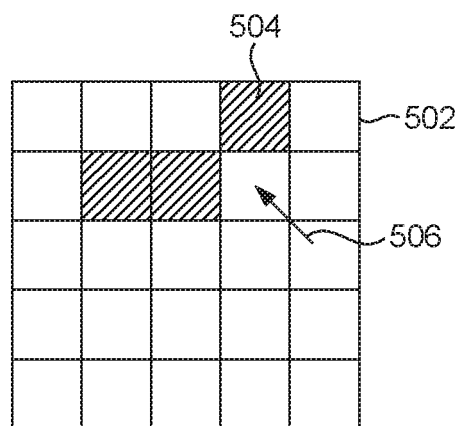

A simple example of the feature tracking which may be performed by optical flow processor so as to determine a direction of movement of the sampled area of skin is shown in FIG. 5. Frames 500-502 are a sequence of three 5×5 pixel images of an area of skin captured by a light sensor. In this example, the x,y axes indicate that the field of view of the light sensor lies in the x,y plane, the z plane being a distance from the optical flow sensor perpendicular to the x,y plane (see FIG. 1). Other arrangements or coordinate systems may be used. Each pixel 503 represents an intensity of light at an element or group of elements of the light sensor. Feature 504 is a patch of one or more pixels (three, in the example shown) which exhibit contrasting intensity relative to the surrounding pixels. Feature 504 could be, for example, a wrinkle or other aspect of the skin's surface relief, a hair, or an area of pigment or other mark.

It can be seen from images 500-502 that feature 504 moves through the 5×5 pixel array indicating that the feature on the skin moves relative to the field of view of the frame and hence the optical flow sensor. By comparing frames 500 and 501 according to an optical flow algorithm, the optical flow processor may determine a vector 505 describing the apparent movement of the feature from the position in frame 500 to its position in frame 501. And by comparing frames 501 and 502, the optical flow processor may determine a vector 506 describing the apparent movement of the feature from the position in frame 501 to its position in frame 502. Frames 500-502 may or may not be consecutive frames.

FIG. 5 is a simplistic example in which there may be only one identifiable feature captured in a sequence of frames. Typically there will be many features and the optical flow processor may be configured to track multiple features so as to determine a vector field describing the offsets of multiple features from between frames. A vector descriptive of the net skin movement may be derived from the vector field—for example, by forming a vector sum of at least some of the vectors of the vector field.

An average of vectors 505 and 506 may be formed to yield vector 507 describing the movement of the skin relative to the optical flow sensor. This can help to improve the accuracy of the motion tracking, especially when using a light sensor with a small number of pixels and hence crude positional accuracy. The optical flow processor 207 may be configured to provide information in any suitable form which describes the apparent movement of features across the field of view of the light sensor: for example, the processor could provide raw vectors (e.g. 504-506) describing skin movement between frames or vectors (e.g. 507) derived from such raw vectors by one or more filtering, averaging or other processing steps.

By sampling light sensor 206 at a relatively high frequency (e.g. at least several hundred Hz and preferably or advantageously at least 1 kHz), the area of skin sampled by the optical flow sensor can be small (e.g. less than 5 mm) since even rapid skin movements will remain in the field of view of the sensor between sampled images. Areas of skin around 3 mm by 3 mm have been found to provide good performance.

Figure 3:
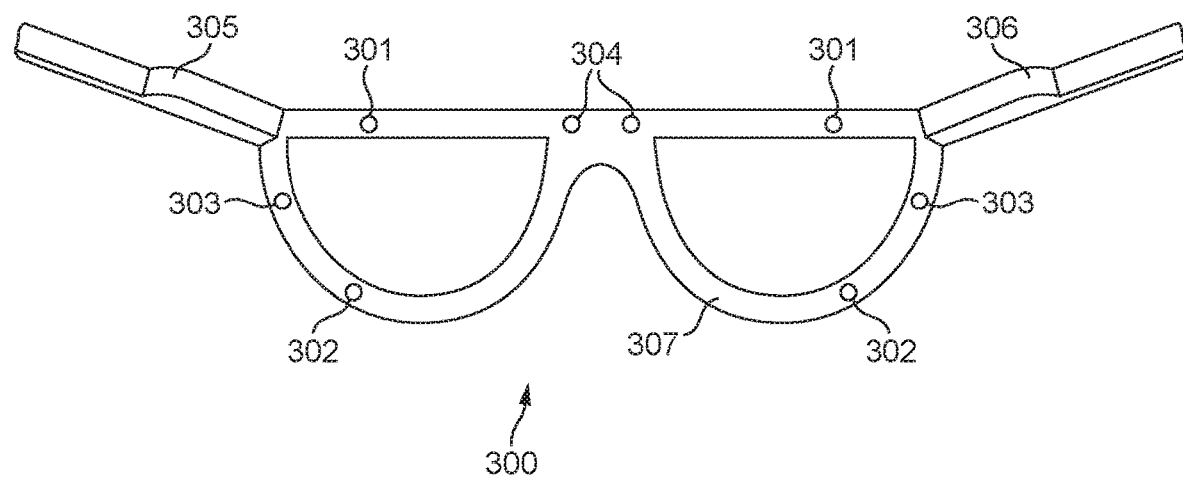
FIG. 3 shows a pair of glasses including the system of FIG. 2.
Figure 4:
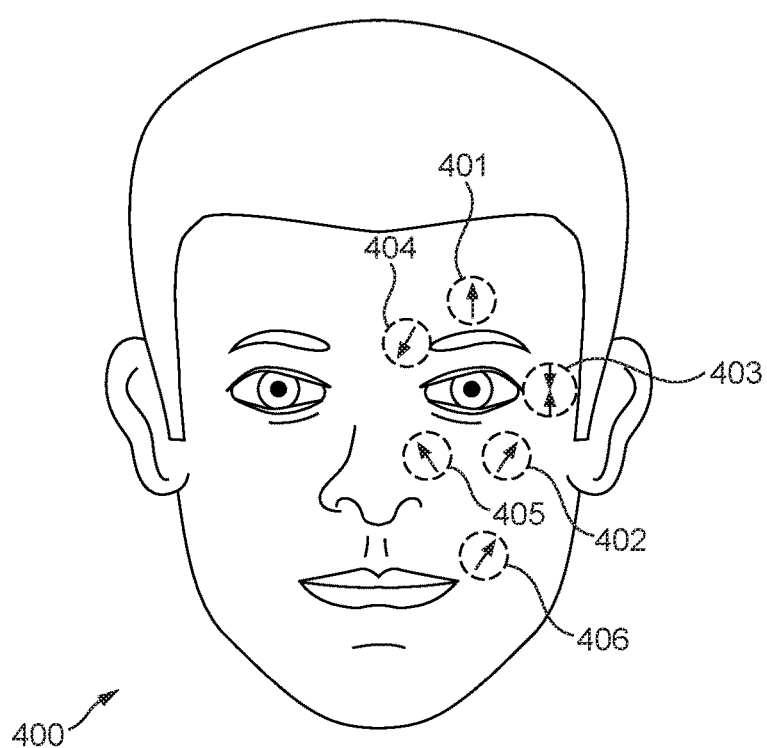
FIG. 4 illustrates the skin locations sampled by the glasses of FIG. 3.

An exemplary use of an optical flow sensor as described herein is shown in FIG. 3 in which a set of optical flow sensors 301-304 are provided at the frame 307 of a pair of glasses 300. The glasses may include one or more housings (e.g. 305, 306 in FIG. 3) which may include additional components such as a battery, a microprocessor for processing the outputs from the optical flow sensors, etc. Each optical flow sensor is located on the frame 307 such that, when the glasses are worn on the face, the sensors detect skin movements which are known to correlate to the muscle activity of certain facial muscles. A set of locations on the face at which skin movement can be sampled so as to infer facial muscle activity is shown in FIG. 4. These locations correspond to the positions of the optical flow sensors in FIG. 3: location 401 is sampled by sensors 301; location 402 is sampled by sensors 302; location 403 is sampled by sensors 303; location 404 is sampled by sensors 304.

More generally the optical flow sensors may be provided at any kind of wearable apparatus for engagement with the face of a user, including, for example, at a virtual reality or augmented reality headset (e.g. a headset face pad adapted to engage with the face of a user), at a safety helmet, at a head-mounted control unit (e.g. as might be worn by pilots, surgeons, or other persons performing a task which occupies their hands). Headwear which provides fuller coverage of the face (e.g. helmets) may include an optical flow sensor to capture movement of skin associated with the orbicularis oris. For example, an optical flow sensor (or an optical fibre providing a conduit to an optical flow sensor—see below) may be provided at a visor of a helmet so as to capture an area of skin adjacent to the lips. This would enable the shape of the mouth to be captured in more detail than would be possible by inferring activity of the zygomaticus major muscle alone.

Figure 2:
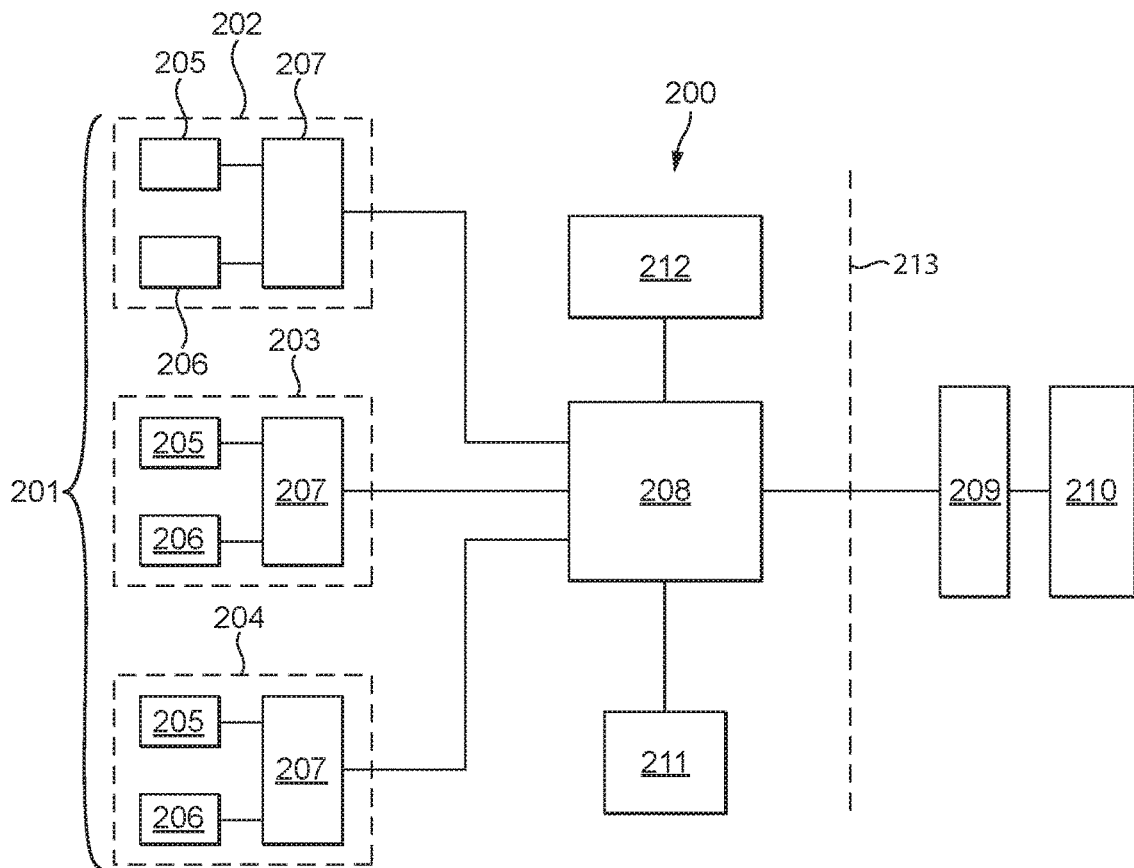
FIG. 2 is a schematic diagram of a system for detecting facial muscle activity.

FIG. 2 illustrates a system for detecting facial muscle activity. At least part of the system may be included within wearable apparatus such as glasses 300. The system 200 includes a set 201 of optical flow sensors 202-204. Each optical flow sensor includes one or more light sources 205, one or more light sensors 206 and an optical flow processor 207. The outputs from the optical flow sensors may be combined at a processor 208. Processor 208 may be configured to provide the outputs from the optical flow sensors or signals derived from the outputs in any suitable form. The processor may perform one or more of multiplexing, encoding, encrypting and compressing the outputs. Processor 208 may be configured to transmit the outputs to another device by wired or wireless transmitter. For example, the processor may be configured to transmit the outputs wirelessly according to a Bluetooth protocol.

Figure 12:
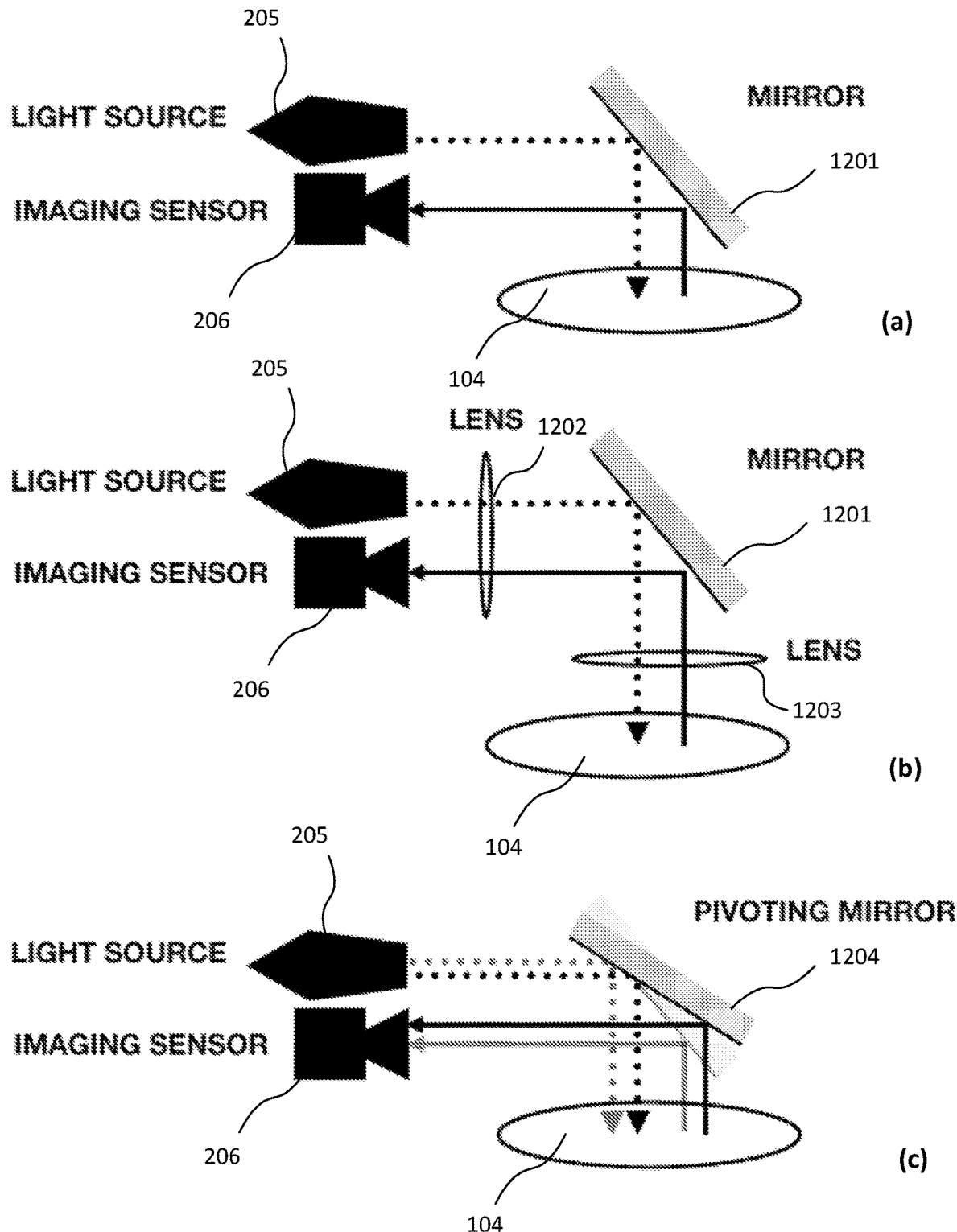
FIG. 12 shows compact arrangements for an optical flow sensor which include a mirror.

In some embodiments one or more mirrors, prisms or other optical devices (not shown in FIG. 2) may be employed to appropriately direct light from the light source and/or to the light sensor. Exemplary uses of a mirror are shown in FIG. 12 in which a light source 205 and imaging sensor 206 are arranged in a compact configuration with a mirror 1201 arranged to direct to and from the skin surface 104. The configurations shown in FIG. 12 enable the size of the optical flow sensor including the imaging sensor 206 to be reduced because the total light path length between the sensor and the skin surface 104 is folded through reflection at the mirror. In FIG. 12 the light path is reflected through 90 degrees but in general the mirror could be configured to reflect light by any suitable angle. As with other configurations described herein, the light source 205 may be optional with ambient light being used to illuminate surface 104.

In configuration (a) no additional lenses are provided—lenses may not be necessary (e.g. the sensor is an optical phased array) or the mirror may be shaped so as to suitably direct light from the surface onto the sensor.

In configuration (b) one or both of lenses 1202 and 1203 may be provided. The lenses are shown schematically in FIG. 12 and could be integrated with the mirror 1201 and/or imaging sensor and/or light source.

In configuration (c) a pivoting mirror 1204 is provided so as to enable the area of skin 104 imaged by the sensor 206 to be controlled without moving the sensor itself.

In some embodiments, processor 208 may be configured to provide vectors describing the skin movement captured by each of the optical flow sensors. Such vector information may be generated at the optical flow sensors. The processor 208 may alternatively or additionally be configured to itself infer the activity of the facial muscles indicated by the captured skin movements. The processor may be configured to provide information describing the activity of the facial muscles. The processor may be further configured to infer one or more facial expressions from the activity of the facial muscles. The processor may be configured to provide information describing the one or more facial expressions.

The processing of data from the optical flow sensors (e.g. vector information and/or images) in order to infer the activity of facial muscles and/or facial expressions may additionally or alternatively be performed external to system 200. For example, processor 208 may be configured to provide data from the optical flow sensors to a computer system configured to process the data so as to infer the activity of facial muscles and/or facial expressions. A computer system could be any kind of system having suitable processing capabilities, such as a personal computer, server, smartphone, tablet, smartwatch, or dedicated processing unit. For example, system 200 for detecting facial muscle activity may be included within a wearable device such as glasses 300 shown in FIG. 3, and processor 208 of the system may be configured to provide data from the optical flow sensors to a smartphone by low energy Bluetooth. An application running at the smartphone may provide suitable processing capabilities in order to infer the activity of facial muscles and/or facial expressions from the optical flow sensor data.

The processor 208 may be configured to process data describing the skin movements captured by the optical flow sensors so as to infer facial muscle activity. In other embodiments such processing may be performed externally to system 200, such as at a computer system to which processor 208 (e.g. a Bluetooth transceiver) provides the outputs from the optical flow sensors 201.

Generally, processor 208 receives time-varying data describing movement of the respective areas of skin from the optical flow sensors 201. Processor 208 may provide the time-varying data to further processing entities or a data store—for example, if another processor is performing muscle activity detection then that other processor may require the data. As described herein, the time-varying data may be one or more of: vector information (e.g. a pair of x,y coordinates expressing a direction and magnitude of movement in the x,y plane of a sensor); a time series of images of the area of skin; or data in any form which captures time-varying contrast at the sampled area of skin (e.g. due to features on the skin, hairs, or its texture).

A dataset is available to the processor 208, or whichever other processor (e.g. at a computer system) is configured to perform muscle activity detection, which relates skin movement at the predefined areas (e.g. the areas shown in FIG. 4) to activity of the associated muscle(s). The dataset may be in any suitable form: e.g. as a set of relationships stored at a table or other data structure; as relationships defined in equation(s) or algorithm(s) performed at the processor; a machine learning model (and/or its parameters) used by the processor to perform muscle activity detection. For example, the dataset may include information defining that for a given area of skin (e.g. 401) imaged by a given optical flow sensor (e.g. 301), when the magnitude of skin movement in a defined direction exceeds a predetermined threshold (optionally for at least a predetermined time) then the associated muscle (e.g. frontalis) is considered to be activated (e.g. contracted). The degree of activation (e.g. contraction) may be given by the magnitude of the movement above the predetermined threshold. Many other approaches are possible.

The time-varying data generated by an optical flow sensor need not be individually processed so as to identify the activation of the associated muscle(s). In some embodiments, the time-varying data from two or more optical flow sensors may be collectively processed so as to determine activity of the associated facial muscle(s). Such collective processing can provide improved performance in distinguishing between different facial expressions because some facial expressions share common activations of individual muscles (e.g. contraction of the frontalis can be associated with expressions of both surprise and fear; activity of other muscles can be used to distinguish between the two expressions).

Detecting muscle activity may include detecting a facial expression, since a facial expression includes a combination of one or more facial muscle activations. By extension, detecting muscle activity may be used alone or in combination with other data (such as head movement, physiological changes associated with alterations in the autonomic nervous system such as skin conductance or heart rate variability) to infer emotional responses of the wearer.

A wearable device incorporating the system 200 for determining facial expression (such as glasses 300 in FIG. 3) may be connected to a computer system in order to provide information on facial muscle activity to the computer system. This could be for a range of purposes, including: for use in a virtual reality (VR) or augmented reality (AR) system (e.g. animating an avatar with the expressions made by the user of the device); to provide biometric security (e.g. performing a predefined series of facial expressions can be used to authenticate a user due to the unique pattern of muscle activations involved in creating a such a series of expressions); for hands-free control (e.g. a user can provide input to a computer system through selective activation of their facial muscles). A glasses based form factor is particularly advantageous for AR as facial expressions may be used for measuring emotional responses as well as biometric confirmations of interactions such as purchases.

Typically, system 200 would be coupled to a computer system by a driver interface 209 provided at the computer system. Dashed line 211 indicates a possible boundary between system 200 and a computer system. An application programming interface (API) 210 may be supported at the computer system so as to provide a convenient interface to other applications running at the computer system (e.g. games, VR or AR software, software for performing biometric authentication).

In some embodiments, fewer optical flow sensors may be provided than there are areas of skin to be imaged by a wearable device. One way this can be achieved is by coupling the optical flow sensors to respective windows 103 (each directed to area of skin to be imaged) by one or more optical fibers or other waveguides.

Figure 9:
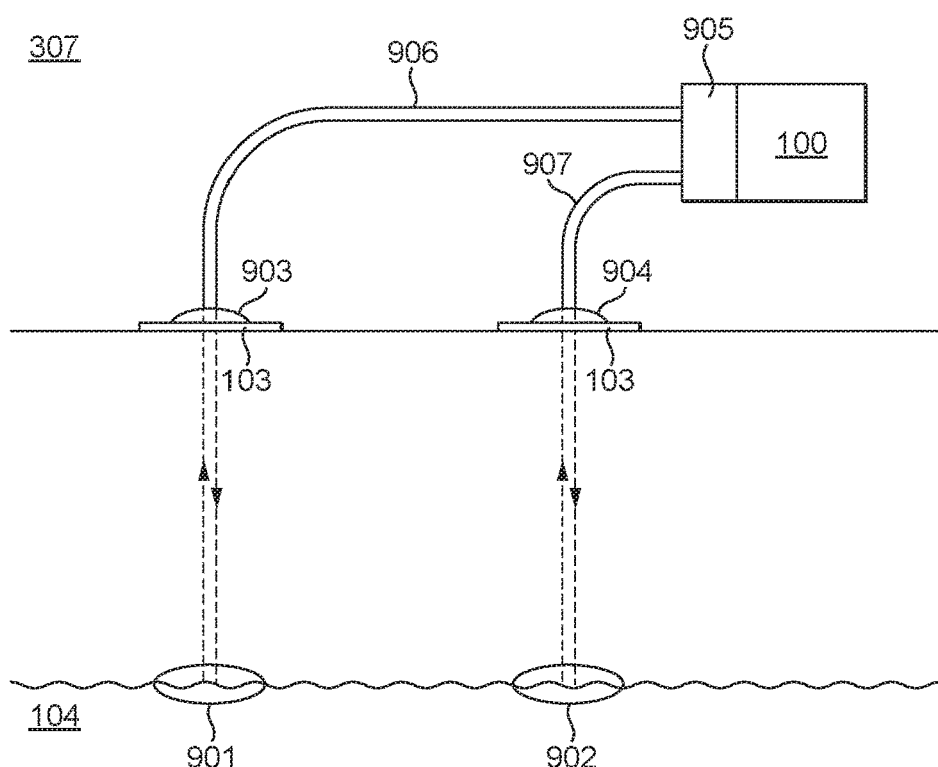
FIG. 9 illustrates a first arrangement of optical flow sensors coupled to the environment by optical fibers.

A first example of a wearable device including optical flow sensors receiving multiple light signals is shown in FIG. 9. In the figure there are two windows 103, each directed to a respective area of skin 901, 902. Optical flow sensor receives light from each area of skin by optical fibers 906, 907. A lens 903, 904 may be provided for each optical fibre so as to appropriately focus reflected light received from the skin into the core of the optical fibre for transmission to the optical flow sensor. Optical flow sensor includes one or more light sensors 206 and one or more light sources 205, as shown in FIG. 1. The light sources are directed down the same optical fibers 906, 907 or different optical fibers so as to illuminate the areas of skin 901, 902.

Optical flow sensor 100 is coupled to the optical fibers by an optical switch 905. Optical switch 905 may be any kind of device configured to direct light received over the optical fibers 906, 907 to the optical flow sensor and to direct light from the light sources to the optical fibers (906/907 or different fibers). The optical switch may include an arrangement of lenses and/or mirrors and/or prisms configured to appropriately direct light to and from the optical fibers and the one or more light sensors and light sources.

In one embodiment, two light sources (e.g. lasers) are provided and configured to emit different colours of monochromatic light. A single light sensor 206 may then be provided including two sets of pixels, each set arranged to detect a different one of the colours of light (e.g. one or more filters, prisms or diffraction gratings 109 may be provided over the sensor so as to pass a selected colour of light to the respective set of pixels of the sensor).

In another embodiment, optical switch 905 is configured to switch between optical fibers 906 and 907 so as to alternately direct reflected light from each optical fibre onto a single light sensor 206. By synchronising the sampling of the light sensor with the switching performed at the optical switch the light sensor can be configured to alternately sample the skin areas 901 and 902. Optical switch 905 could effect the switching using, for example, one or more liquid crystal filters which can be electrically switched between substantially transparent and substantially opaque so as to pass or block light from a given optical fibre, or controllable mirrors which can be steered to alternately direct light from the optical fibers onto the light sensor (e.g. a microelectromechanical (MEMS) device including an array of one or more steerable mirrors could be used to perform switching at an appropriate rate). A single light source may be provided which is similarly switched or directed to the optical fibers so as to illuminate the areas of skin 901, 902 synchronously with the light sensor being sampled.

Optical switch 905 may include one or more mirrors configured to appropriately focus light from the light source (s) into the cores of the respective optical fibers, and light from the cores of the respective optical fibers onto the light sensor.

Figure 10:
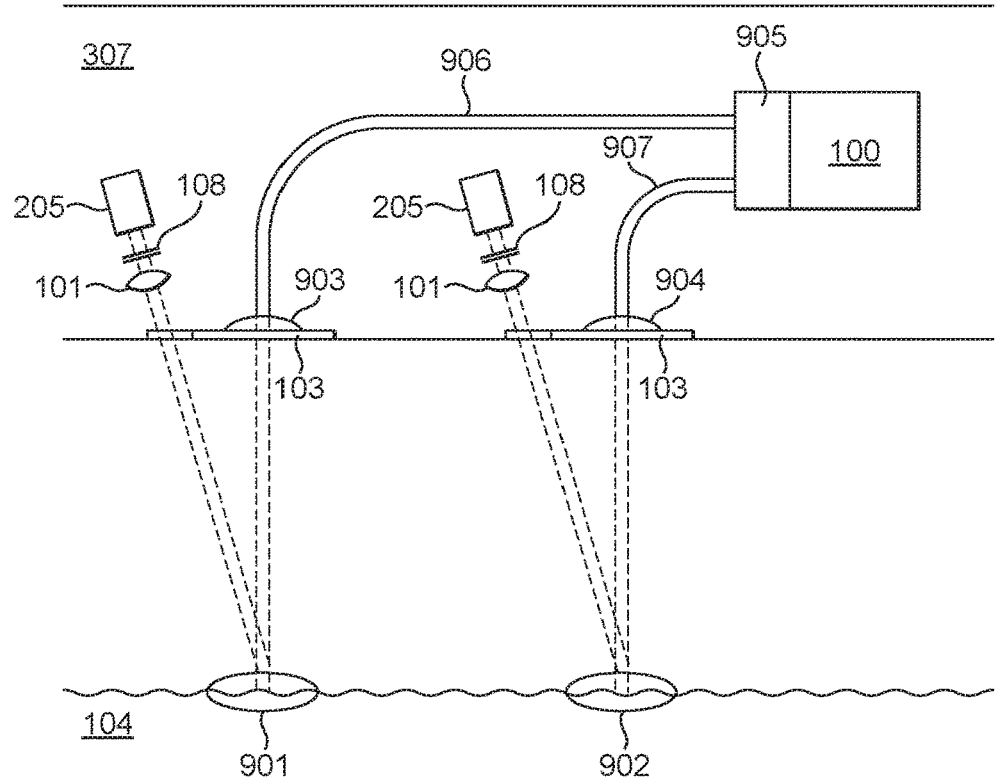
FIG. 10 illustrates a second arrangement of optical flow sensors coupled to the environment by optical fibers.

In other embodiments, light sources are not provided at optical flow sensor 100 and are instead provided at each window 103 of a wearable device. This is illustrated in FIG. 10 which shows light sources 205, along with their optional respective filters 108 and lenses 101, arranged to illuminate the areas of skin 901, 902. The light sources, filters and lenses may be configured in any manner described herein (e.g. above in relation to FIG. 1). Optical fibers 906, 907 carry light reflected by the respective skin areas 901, 902 to the optical flow sensor. Optical switch 905 may operate as described above but in this embodiment need not include any components for appropriately directing light from the optical flow sensor to the windows 103. This arrangement can significantly simplify the optical switch and so reduce the cost and complexity of the system.

In a particularly advantageous configuration of the embodiments illustrated in FIG. 10, optical switch 905 includes one or more lenses for each of the optical fibers 906, 907 which are configured to direct light from the optical fibre onto a light sensor 206 at optical flow sensor 100. The optical switch further includes a pair of liquid crystal filters configured to alternately block light passing from each optical fibre onto the light sensor. The light sensor is sampled by its processor 207 (which could be one and the same integrated circuit as the light sensor) synchronously with the liquid crystal filters so as to capture interleaved sequences of images of skin areas 901 and 902. By separately performing optical flow processing on each sequence of images, the processor 207 (or another processing unit, as described herein) may detect movement of the skin surface at the respective skin areas.

A wearable device (e.g. pair of glasses 300) may include only one or two optical flow sensors arranged to detect motion at several areas of skin (e.g. the optical flow sensors may be provided at housings 305, 306). This can provide significant packaging benefits in terms of a reduction in the volume occupied by the optical flow sensors. Additionally, using fewer optical flow sensors can reduce the cost of a wearable device and its power consumption.

In some embodiments, fewer light sources may be provided than there are areas of skin to image with one or more common light sources being configured to illuminate multiple areas of skin by one or more optical fibers or other waveguides. An optical flow sensor may be provided for each area of skin which does not include a light source (since a common light source is provided). For example, one or two light sources (e.g. a laser diode) could be provided whose emitted light is directed to each area of skin by one or more optical fibers. No complex optical switching need be provided with such a solution since an optical flow sensor may be provided for each area of skin and laser light may be directed to each area of skin.

It is advantageous for system 200 to include one or more motion sensors 211, such as an accelerometer, gyroscope or inertial measurement unit (IMU). As a user moves around, a wearable device including system 200 is likely to move relative to that user. For example, a pair of glasses 300 would be liable to shift slightly about the face of the user as the user moves their head. Such movements would be picked up by the optical flow sensors.

A motion sensor 211 may be used to filter out movements of a wearable device that are not indicative of muscle activity. For example, processor 208 may be configured to damp or ignore signals from the optical flow sensors that are acquired during periods of large acceleration (e.g. above some predetermined threshold) as measured at the motion sensor. Processor 208 may be configured to damp or ignore components of skin movement detected by the optical flow sensors which are aligned in direction with a motion (e.g. an acceleration) measured by the motion sensor. Processor 208 may be configured to subtract a component from skin movements detected by the optical flow sensors that are aligned in direction with a motion (e.g. an acceleration) measured by the motion sensor. For a given magnitude and direction of motion (e.g. acceleration) measured at the motion sensor, an appropriate size component to subtract, or the amount of damping to introduce into movement vectors captured by the optical flow sensors may be determined by trial and error. A particularly advantageous approach is to use machine learning to determine an appropriate set of damping factors and/or vector components for subtraction from a skin movement vector determined by each optical flow sensor.

It is further advantageous to provide more than one motion sensor at a wearable device including system 200. This enables rotational movement of the wearable device about one or more axes to be determined and modification of the vector movements describing the skin movement at each optical flow sensor to be further refined. It can be particularly advantageous to locate one or more first motion sensors at a point of minimal movement relative to the user (e.g. close to the distal ends of the arms of glasses 300 which tend to move a minimal amount relative to the skin) and one or more second motion sensors which are located close to one or more optical flow sensor(s). This enables the processor to variably modify the skin movement vectors captured by the optical flow sensors in dependence on the likely slippage of the wearable device relative to the skin (e.g. the relatively unsecured proximal ends of the arms of the glasses are likely to experience larger movement relative to the skin than the distal ends secured against the sides of the user's head).

One or more motion sensors 211 may include proximity sensors configured to detect a distance from the proximity sensor to the skin of the user. By monitoring variations in the distance to the skin from such proximity sensors, processor 208 may be configured to determine movement of the wearable apparatus including the system 200 relative to the face of the user and hence damp or subtract out movements detected at the optical flow sensors which are due to relative movement between the wearable device and the face of the user. A proximity sensor may be, for example, a light sensor configured to detect variations in intensity of light received from a light source reflected off the skin or configured to use any other technique described herein or known in the art.

For a face-worn device including a nosepiece such as glasses 300, it can be advantageous to provide a proximity sensor at the bridge of the nosepiece in order to detect when the device is removed by the user. On the proximity sensor detecting that the device has been removed (e.g. when the distance to the skin measured by the proximity detector exceeds some predetermined threshold), at least some parts of the device may be configured to enter a sleep state (e.g. its one or more light sources). Optionally its optical flow sensors may enter a sleep state. Optionally processor 208 may enter a sleep state.

When the motion measured at one or more motion sensors exceeds one or more predetermined thresholds (optionally for a predetermined time), the optical flow sensors may be put into a sleep state and/or processing so as to infer muscle activity and/or facial expression may be interrupted until motion drops below the thresholds. Additionally, when the motion measured at one or more motion sensors drops below one or more predetermined thresholds (optionally for a predetermined time), the processing so as to infer muscle activity and/or facial expression may be interrupted to reduce energy consumption and processing such as when the wearer is immobile.

In some embodiments, the optical flow sensors may be configured to provide proximity information. The proximity sensors described above may be optical flow sensors. For example, processor 207 may be configured to infer a distance from the optical flow sensor to the skin from an intensity of light from light source 205 which is reflected from the skin and received at the light sensor 206. Generally, the intensity of light decreases as the distance to the skin increases. It is advantageous to configure the optical flow sensor to distinguish between light from light source 205 and environmental light, for example, through the use of one or more polarizing or coloured filters 108, 109, as described herein. In other examples, the data from the optical flow sensors may be processed at processor 208 or externally to system 200 (e.g. at a computer system) in order to infer a measure of distance from the sensors to the skin.

Given the intensity of light output by light source 205 (which may be either fixed or known to processor 207, and may be reported in data provided to processor 208), the relationship between received light intensity and distance may be establish through suitable calibration routines. Typically, the absolute distance to the skin is not important and a measure of distance to the skin need identity can be only a variation in distance between the skin and optical flow sensor.

Alternatively or additionally, processor 208 may be configured to compare the outputs from two or more optical flow sensors so as to identify common movements which are indicative of gross movement of the wearable device including system 200 relative to the skin. Such components could be, for example, partially or completely subtracted from the output vectors of those optical flow sensors and/or otherwise damped. Preferably or advantageously the optical flow sensors which are compared relate to different muscles that do not operate in sympathy to one another so as to avoid removing vector components which are indicative of muscle activity. Since different optical flow sensors directed to skin associated with different facial muscles are likely to have different orientations in space, processor 208 would typically need to convert between the coordinate system local to each optical flow sensor so as to identify common movements.

Suitable information for performing such coordinate conversions may be stored by the processor.

Figure 18:
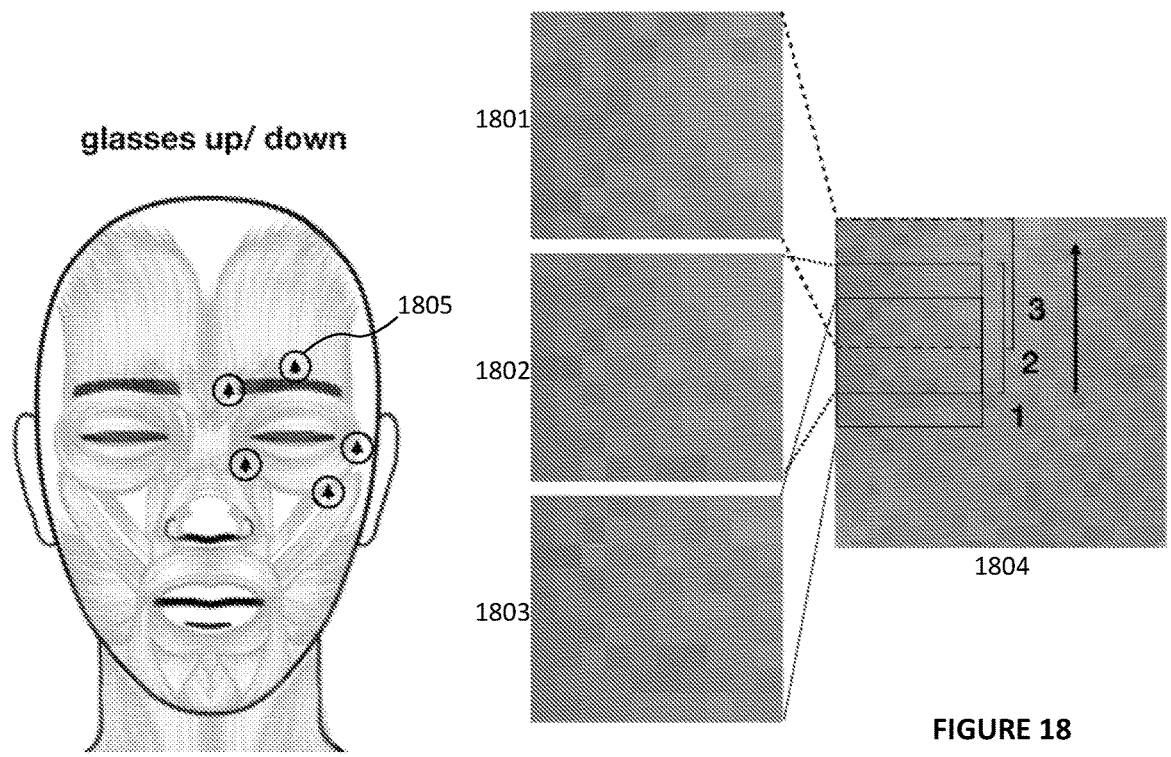
FIG. 18 illustrates the glasses of FIG. 3 moving vertically relative to the face.
Figure 19:
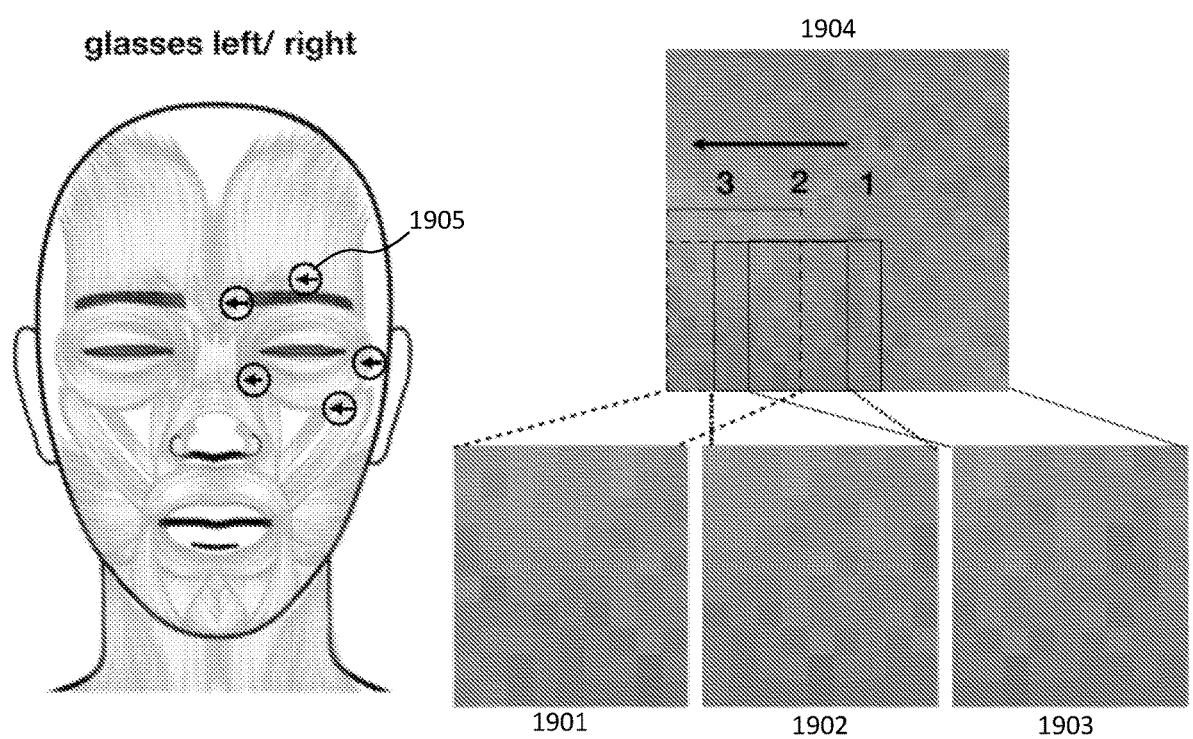
FIG. 19 illustrates the glasses of FIG. 3 moving laterally relative to the face.

The signals captured at the sensors of the glasses shown in FIG. 3 due to gross movements of the glasses are illustrated in FIGS. 18 and 19. In FIG. 18 the glasses are moving upwards relative to the face (e.g. the user is out jogging causing their glasses to bounce slightly against the bridge of their nose) and hence the optical flow sensors of the glasses all or most detect their respective areas of skin moving downwards. Sensor 1805 (301 in FIG. 3) in particular is configured to detect the movement of skin patch 1804 which it overlies. At any given point in time the sensor has a portion of that skin patch within its field of view. As the glasses move upwards relative to the face the optical flow sensor 1805 sequentially captures skin areas 1803, 1802 and 1801. The figure illustrates the position of these skin areas within the larger skin patch 1804. Consequently sensor 1805 will detect a downward motion of the skin relative to the sensor.

When a plurality of sensors detect a similar motion which cannot be due to a facial expression the processor 208 can determine that the motion is a gross movement of the glasses relative to the face. For example, gross movement may be determined when all or a majority of the sensors determine movement in the same or a substantially similar direction. The all or majority of the sensors may be of a set which provide an output above some predefined threshold or noise floor. In order to determine gross movement, the plurality of sensors may need to each detect a similar motion which is above some respective threshold. On determining gross movement the processor may be configured to not perform expression detection until it is determined that the glasses have stopped moving or the movement has fallen below some respective threshold for each or all or most of the plurality of sensors (e.g. by the sensors ceasing to detect gross motion and/or the use of a motion sensor).

Similarly, FIG. 19 illustrates the movement of the glasses in a leftwards direction (rightwards from the view of the user depicted in the schematic figure) and the detection at sensor 1905 of relative skin movement to the right. Optical flow sensor 1905 sequentially captures skin areas 1903, 1902 and 1901 within skin patch 1904 which sensor 1905 overlies. Again, since the other sensors detect a similar motion the processor 208 can determine that the motion is a gross movement of the glasses relative to the face and suppress expression detection until it is determined that the glasses have stopped moving.

The approach described with respect to FIGS. 18 and 19 enables gross motion of the apparatus supporting the sensors to be determined without requiring that a motion sensor is provided at the apparatus (although a motion sensor may nevertheless be provided).

In order to detect the activity of facial muscles, each optical flow sensor is located at the wearable apparatus so as to capture the movement of skin at a point on the face that is indicative of activity of one or more associated muscles. Since each optical flow sensor is located at a known position on the wearable apparatus, it is known what area of skin the optical flow sensor will image when the wearable apparatus is worn by a user, and hence it is known which muscle(s) associated with that area of skin the sensor will detect the activity of. In particular, and as described above, an optical flow sensor may be located so as to capture the movement of skin close to the insertion point of the associated facial muscle at the skin. In the case that the skin movement is captured as a vector, it may be necessary to locate optical flow sensors at a position not centrally overlying a facial muscle, but offset to one side (e.g. by a few or several millimetres). This is because for certain facial muscles, the skin overlying the muscle may be evenly contracted or stretched which can lead to an overlying optical flow sensor determining net zero translation of the skin (e.g. because the vectors of a vector field in that region cancel one another out). By offsetting an optical flow sensor from the centre of a muscle, the movement of an area of surrounding skin which does not overlie the subject muscle can be captured. For example, in the case of a muscle that on contraction causes the skin overlying the muscle to contract and "bunch up", the skin surrounding the muscle will be pulled towards the focus of the contraction. As a result, positioning an optical flow sensor over a patch of skin surrounding the muscle allows contraction of the muscle to be determined by identifying movement of that patch of skin towards the centre of that muscle.

It can be advantageous for one or both of optional lenses 102, 101 to be adjustable so as to enable the position of the imaged area of skin to be adjusted relative to the wearable device. This can enable a wearable device to be adjusted to suit different facial dimensions and characteristics. In a preferred or advantageous embodiment, optical flow sensor 100 is provided as a single steerable unit including at least the light source 205, light sensor 206 and any lenses 102, 101. For example, the optical flow sensor may be pivotally coupled to its housing 307 (e.g. mounted in a gimbal having one or more axes of rotation) so as to allow the area of skin to which the optical flow sensor is directed to be adjusted as appropriate to a particular user.

Figure 6:
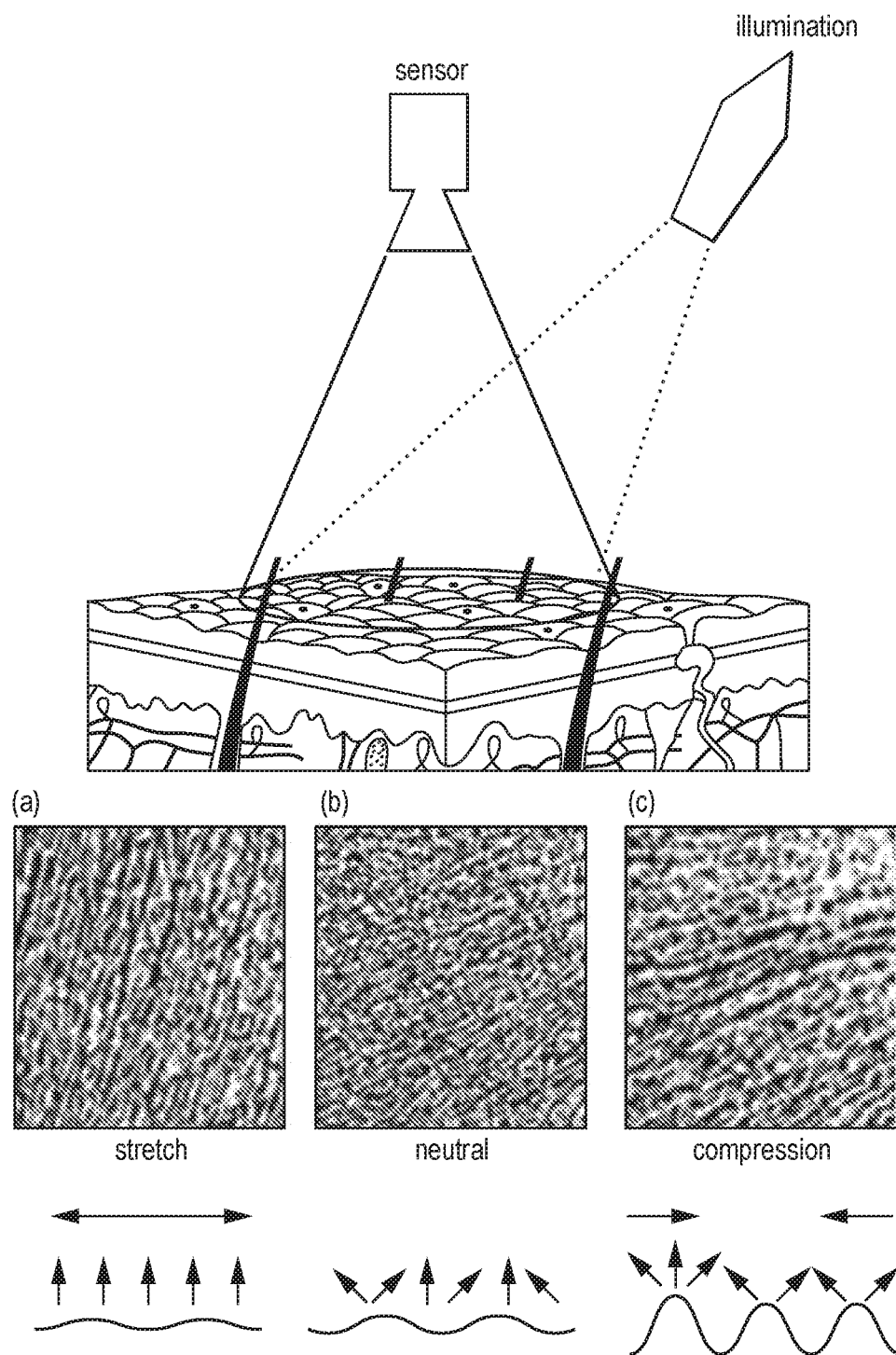
FIG. 6 illustrates the effect of stretching and compression on skin texture.

FIG. 6 illustrates an example of an area of skin overlying a muscle which experiences contraction and stretching but which does not exhibit significant gross translation. The central image (b) shows an area of skin when the tone of a muscle underlying the skin is neutral. Images (a) and (c) show the same area of skin when stretched and compressed, respectively. It will be appreciated that the net vectors which might be generated for images (a) and (c) to describe gross skin movement may be close to zero (and hence not useful for determining muscle activity) due to different parts of the image moving in opposite directions (leading to cancellation between component vectors tracking different features in the image). It will be appreciated that image analysis will demonstrate different lines of pull due to changes in orientation of glyphic skin elements which orient in line with the muscle co traction.

In general, each optical flow sensor is located at the wearable apparatus such that the vector output of each sensor is indicative of the activity of the respective muscle. More than one optical flow sensor may be provided for a given muscle. Each sensor may detect skin movement due to more than one muscle.

FIG. 4 illustrates an exemplary set of facial muscles suitable for monitoring by wearable apparatus such as the glasses 300 shown in FIG. 3. Skin areas 401 to 406 may be monitored by an optical flow sensor so as to infer the activity of one or more associated muscles. Skin area 406 may be monitored by an optical flow sensor mounted above the skin around the mouth. An optical flow sensor is not provided at glasses 300 for skin area 406, but an optical flow sensor might be provided at a helmet or other facewear providing a suitable mounting point about the skin around the mouth. The arrows shown at each area indicates the primary direction of skin movement due to contraction of the associated muscle. Facial muscles are almost unique in that they insert to skin rather than via tendons. The locations of the skin areas monitored by the optical flow sensors are preferably or advantageously selected for their proximity to the insertion or origin points of muscles to the skin. This helps to ensure that the skin movement captured by the optical flow sensors substantially occurs in the plane of the skin rather than out of the plane of the skin (i.e. substantially in the x,y planes of the optical flow sensors according to the coordinate axes indicated in FIG. 1).

The muscles indicated in FIG. 4 and the movements and facial expressions with which they are associated are as follows:

401—frontalis; brow elevation movement associated with surprise, fear, looking upwards;

402—zygomaticus major; lifting corner of mouth movement associated with smiling, pain, tight eye closure, winking and certain phonemes such as "ee";

403-orbicularis oculi; closing eye, blink/wink movements associated with blinking/winking, smiling and fatigued expression;

404—depressor supercilii, procerus, corrugator supercilii; brow lowering movement associated with frowning, anger, concentration, pain, response to bright lights;

405—levator labii; nose crinkle and upper lip elevation movements associated with disgust, sneering.

406—orbicularis oris; closes the lips and facilitates puckering, and antagonises the action of the smiling muscles Each optical flow sensor is oriented at a wearable device so that, when the device is worn, the activation of the respective muscle causes skin movement in a known direction relative to the optical flow sensor. For example, an optical flow sensor may be oriented such that the direction of movement of an area of skin when an associated facial muscle is activated occurs in a known direction in the x,y plane indicated in FIG. 1. A muscle may have more than one mode of activation, each causing a skin movement in a known direction in the field of view of the respective optical flow sensor. An optical flow sensor may be configured to ignore or down-weight skin movements in directions other than substantially along the expected direction of skin movement.

Figure 20:
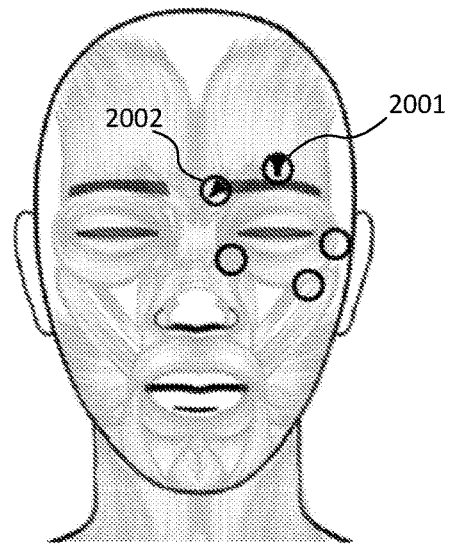
FIG. 20 illustrates the direction of activity of various muscles when the face is performing four different expressions.
Figure 20:
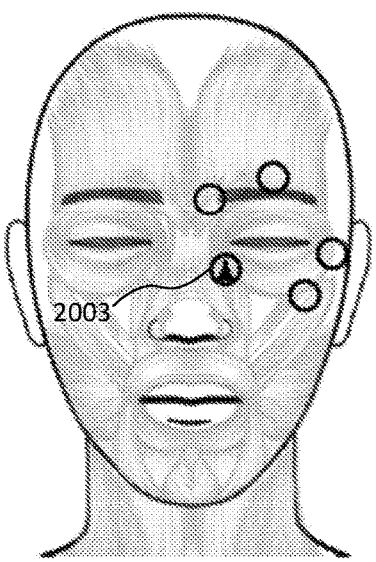
Figure 20:
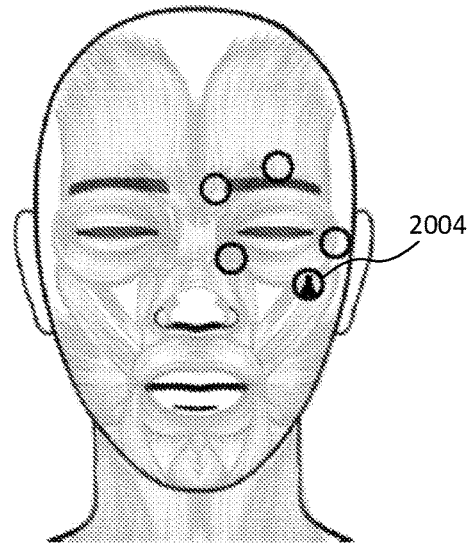
Figure 20:
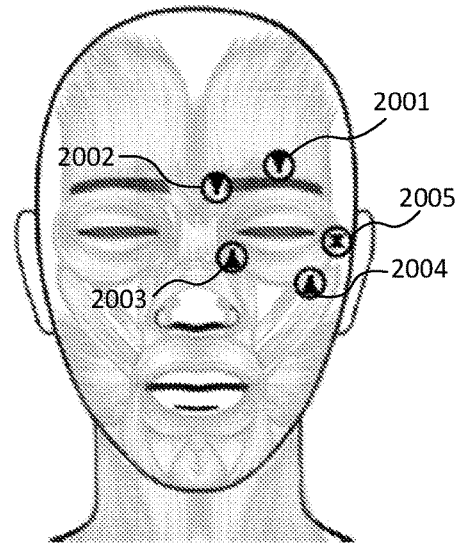

A set of four exemplary muscle activations at the sensors of the glasses shown in FIG. 3 are shown in FIG. 20. The sensors could be any combination of sensors configured to detect the muscle activity shown, including optical flow, EMG, and proximity sensors, and any combination thereof. The movement of the skin beneath each of the sensors is indicated by the respective arrow at each sensor location. The absence of an arrow indicates that no or minimal activation is expected of the muscle that sensor is configured to detect. The code of each expression according to the Facial Action Coding System is indicated in the figure.

In the case of a frown, skin area 2001 is pulled downwards and skin area 2002 is pulled down and towards the midline. To show disgust, skin area 2003 is pulled upwards. For a smile, skin area 2004 moves upwards. In the case of tight eye closure (e.g. when in pain), all or most of the skin areas around the eye are pulled towards a horizontal line which passes laterally through the eyes. The muscles involved in each expression are indicated above.

In some embodiments, an optical flow sensor may be configured to provide a scalar value rather than a vector, the scalar value indicating the magnitude of the vector component of movement along the expected direction of movement of an area of skin in response to activation of an associated muscle. However, due to differences in physiology from person to person it is preferable or advantageous for each optical flow sensor to provide a vector output describing the magnitude and direction of skin movement in the sampled area. This is because the precise direction of skin movement in response to a facial muscle activation can vary between people. Arranging each optical flow sensor to provide information describing the magnitude and direction of skin movement enables a wearable device to be calibrated to a user: for example, the direction of maximal skin movement for a given user can be established in a calibration mode of a wearable device by causing a user to make a particular facial expression, determining the direction of maximal skin movement detected by the respective optical flow sensor and storing that direction for use by processor 208 in determining the facial muscle activity of that user.

Processor 208 is configured to process the outputs of the optical flow sensors 202-204 so as to determine activity of the respective facial muscles. Processor 208 may be configured to determine the activity of a facial muscle in dependence on the magnitude and/or direction of skin movement detected by an associated optical flow sensor. For example, processor 208 may have access to data held at a memory 212 which identifies for each optical flow sensor a direction of skin movement as measured by that sensor which is indicative of activation of the associated muscle. Processor 208 may be configured to infer activation of the associated muscle when the magnitude of movement in the stored direction exceeds some predefined threshold. The degree of activation of a muscle may be determined in dependence on the magnitude of skin movement in the stored direction (optionally subject to the magnitude being above a predefined threshold).

In general, processor 208 is configured to identify a pattern in the magnitude and direction of information received from one or more optical flow sensors directed to a facial muscle or group of muscles. Identifying such a pattern may include, for example, identifying that the magnitude of skin movement detected by an optical flow sensor exceeds some predetermined threshold, or identifying that a component of skin movement in some predetermined direction as detected by an optical flow sensor exceeds a predetermined threshold. A facial muscle may have different modes of activation characterised by different associated skin movements, such as skin movements in different directions (e.g. due to interactions with neighbouring facial muscles). By configuring processor 208 to identify those different skin movements the processor may distinguish between such different modes of activation of the associated muscle.

A particularly advantageous approach to detecting facial muscle activity using system 200 embodied at wearable apparatus is to treat the outputs of the optical flow sensors (preferably or advantageously information describing the direction and magnitude of skin movement detected by each sensor) as inputs to a machine learning system. By causing a user to activate different facial muscles and informing the machine learning system which muscles are being activated, the machine learning system can (using suitable algorithms) learn to identify what set of inputs (and optionally their variation over time) are associated with each facial muscle being activated. The machine learning system may provide a dataset for use by processor 208 so as to enable the processor to detect muscle activations according to the scheme learned by the machine learning system.

In some embodiments, system 200 is alternatively or additionally configured to detect facial expressions including activations of multiple facial muscles. As described above in relation to determining the activation of facial muscles based on the outputs of one or more optical flow sensors directed to captured skin movement associated with that facial muscle, such a system may be configured to identify patterns in the magnitude and direction information received from the set of optical flow sensors 201. Identifying such a pattern may include, for example, identifying that the magnitude of skin movements detected by one or more of the set of optical flow sensors each exceed some respective predetermined threshold, or identifying that the components of skin movement detected by one or more of the set of optical flow sensors each exceed some respective magnitude threshold in a respective predetermined direction.

A particularly advantageous approach to detecting facial expressions using system 200 embodied at wearable apparatus is to treat the outputs of the optical flow sensors (preferably or advantageously information describing the direction and magnitude of skin movement detected by each sensor) as inputs to a machine learning system. By causing a user to perform different facial expressions and informing the machine learning system which facial expressions are being activated, the machine learning system can (using suitable algorithms) learn to identify what set of inputs (and optionally their variation over time) are associated with each facial expression. The machine learning system may provide a dataset for use by processor 208 so as to enable the processor to detect facial expressions according to the scheme learned by the machine learning system.

A machine learning system for learning facial muscle activations and/or facial expressions may be provided at a computer system to which wearable apparatus including system 200 is connected, and the wearable apparatus may be provided with a learning mode in which the outputs of the optical flow sensors 201 are passed through to the machine learning system at the computer system. A dataset formed by such a machine learning system may be stored at memory 200 for use by the processor. Such a dataset could include, for example, an algorithm or set of parameters for a pre-defined algorithm, executable code for processor 208, etc.

In some embodiments, processors 207 and processor 208 may be one and the same with a single processor coupled to a set of light sources 205 and light sensors 206. A processor may include one or more processing units.

Due to the interaction of different facial muscles when a facial expression is made, the magnitude and/or direction of movement of an area of skin when an associated muscle is activated can vary depending on which other facial muscles are activated. For example elevation of the eyebrows in surprise is associated with relaxation of the corrugator muscle and creates a significant upward movement of the skin of the forehead. Whereas the expression of fear commonly is associated with contraction of the corrugator muscles together with the frontalis muscles. This combination elevates may be only the medial part of the frontalis, to a lesser extent than in surprise due the antagonistic action of the corrugator muscle pulling the brow downward and medially. In the exemplary device shown in FIG. 3, such expressions could be distinguished in the direction and/or magnitude of the skin movements detected by the optical flow sensors 401 and 404. The direction and/or magnitude movement detected by optical flow sensors can therefore yield information about a particular facial expression being made.

Furthermore, the direction of maximal skin movement can vary according to the degree of activation of associated facial muscles and other muscles involved in a particular facial expression. For example a subtle smile may not create activation of orbicularis oculi with consequent movement of the overlying skin. Whereas a smile approaching maximal intensity will result in co-contraction of the orbicularis oculi. It can therefore be advantageous to configure processor 208 to identify time-varying patterns of skin movements from the set of optical flow sensors which correlate to the progression of a facial expression. This (along with detected magnitude of muscle activations) can help to provide information regarding the strength of a facial expression (e.g. the 'size' of smile). Such information may be provided by processor 208 (e.g. via API 210) for use by suitable applications at a computer system. In particular, the ability to include the time varying direction of skin movement during facial expressions can enable system 200 to capture natural facial expressions—e.g. for recreation at an avatar in a VR environment or AR representation.

Figure 7:
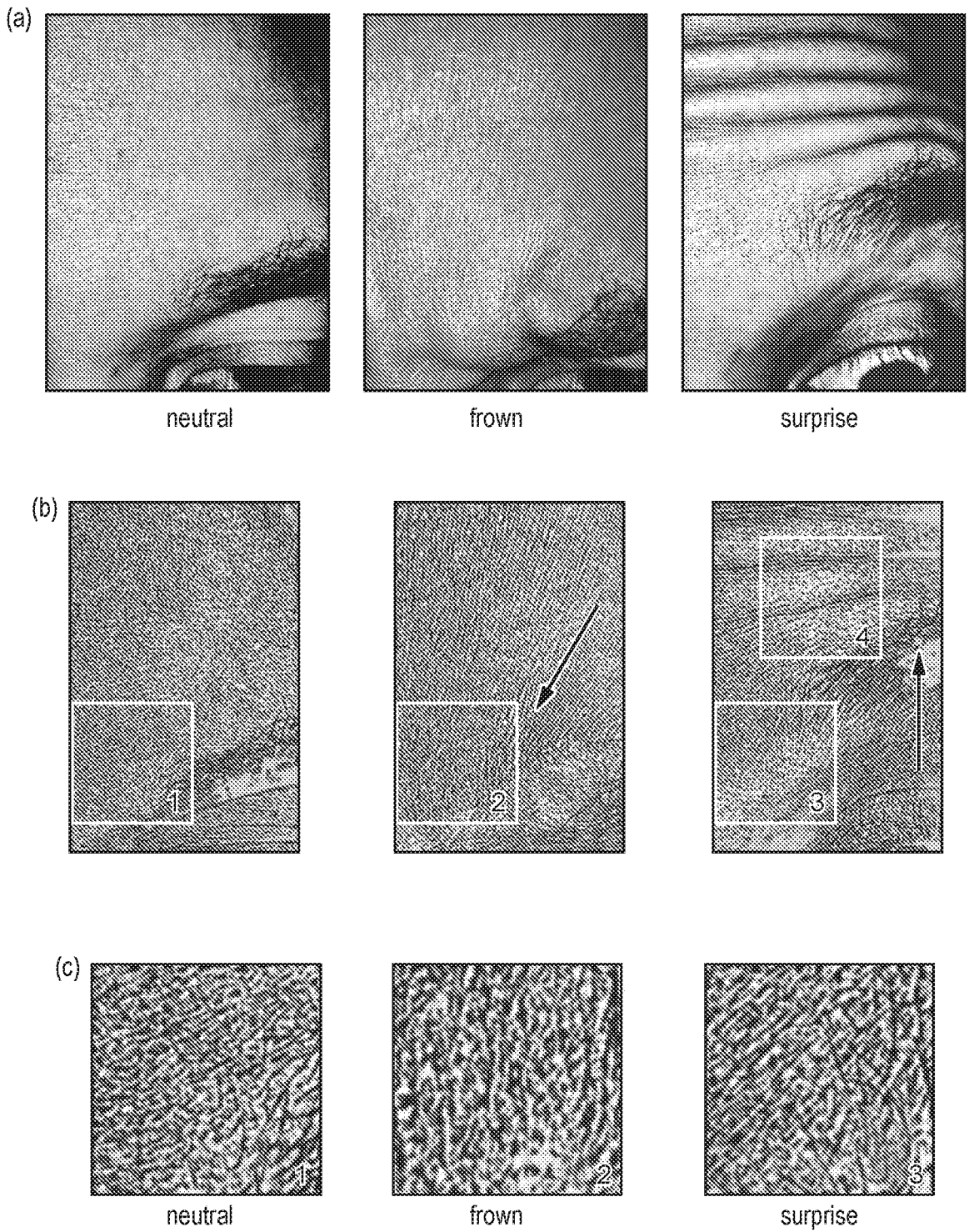
FIG. 7 illustrates the differing effects of frowning and surprised expressions an area of forehead skin.

FIG. 7 illustrates an area of skin which exhibits different movements according to the facial expression being made. Image triplet (a) shows three photographs of an area of forehead skin when neutral, frowning and surprised expressions are made. Image triplets (b) and (c) show the same area at progressive levels of magnification. The arrows in images of triplet (b) show the movement of the skin when each expression is made. It can be seen that during frowning the visualised area of skin moves downwards towards the bridge of the nose due to the action of the associated depressor supercilii, corrugator and procerus muscles. During surprise the visualised area of skin moves upward due to the action of the frontalis muscle. The texture of the skin when each of the expressions is made is shown in image triplet (c).

In the above examples, the optical flow sensors are described as providing vector information describing the movement of the respective areas of skin. The optical flow sensors may alternatively or additionally provide a stream of captured images to the processor 208. The optical flow processors may be operable in a mode in which a stream of images may be provided rather than vector information describing movement in the field of view of the sensor. This can enable muscle activations to be captured which are, for example, better characterised by changes in skin texture than by surface skin movements. This can be useful if, given the packaging or design considerations of a wearable device, it is not possible to locate an optical flow sensor at a position which would capture skin movement indicative of muscle activation.

Figure 8:
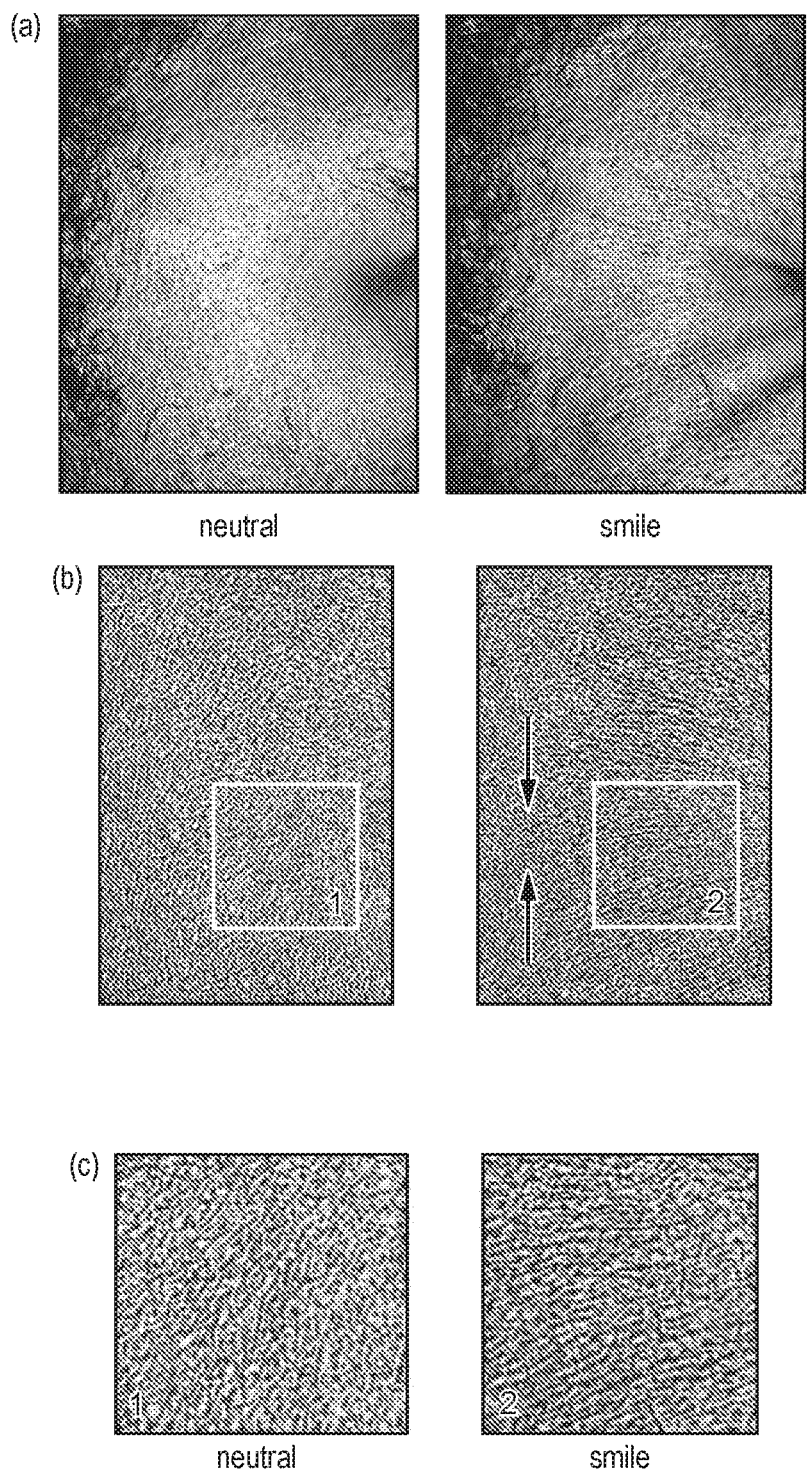
FIG. 8 illustrates the effect of contraction of the orbicularis occuli muscle on an area of skin at the 'Crow's feet' region at the corner of the eye.

An example of the changes in skin texture that can be expected due to stretches and compressions of skin are shown in FIG. 8 which illustrates an example of an area of skin which exhibits contraction but no significant gross translation on activation of the associated muscle. Image pair (a) shows photographs of the 'Crow's feet' region at the corner of an eye under a neutral facial expression and when smiling. Image pairs (b) and (c) show images of the same area of skin at progressively increasing magnifications. The underlying orbicularis occuli muscle causes the contraction of the skin when activated. It can be seen from the image pair (c) that the texture of the images is significantly different so as to permit the images to be distinguished using suitable image processing algorithms. In this manner it is possible to determine different modes of activation of facial muscles from texture alone and without requiring net skin movement.

Figure 11A:
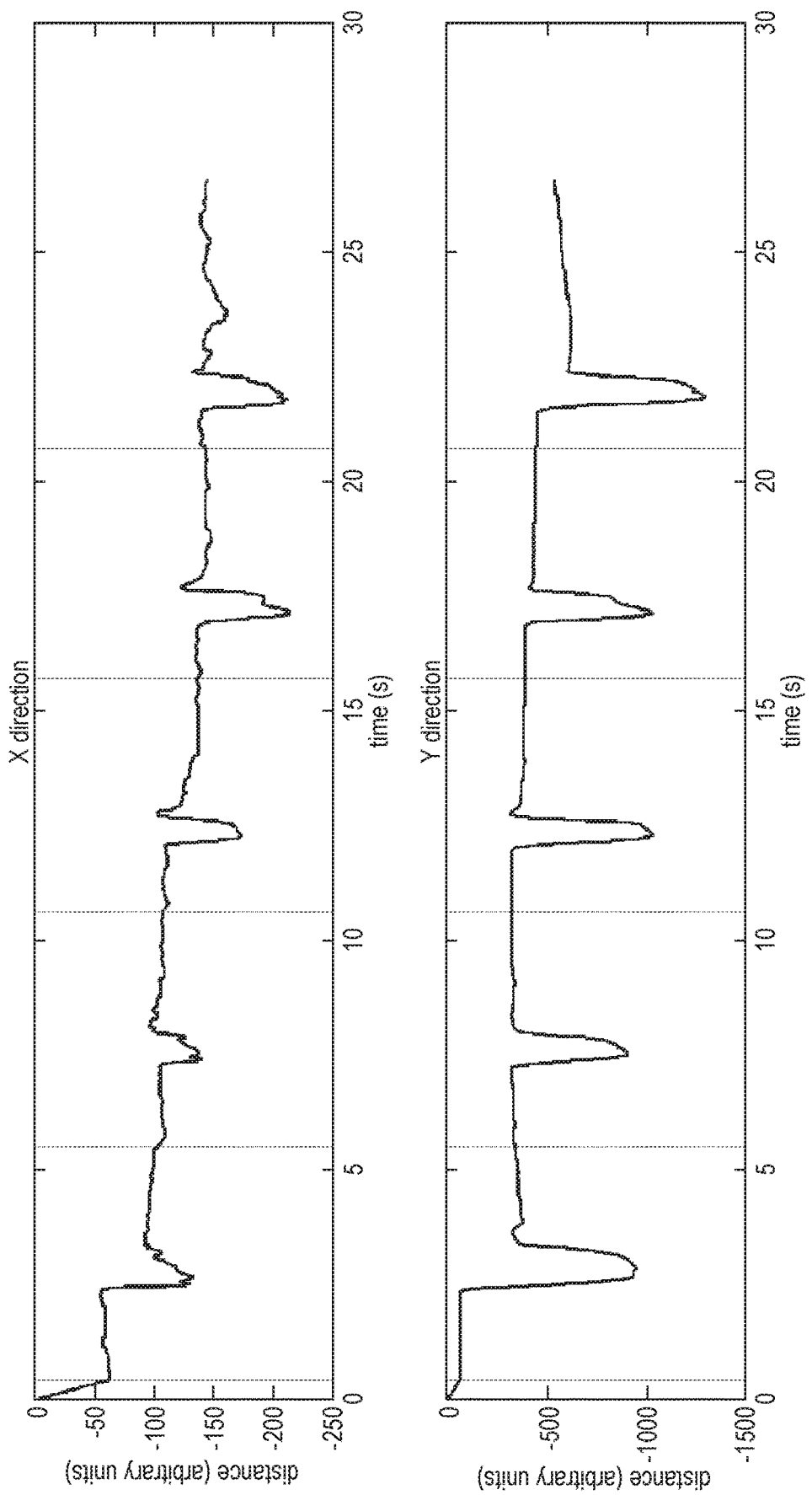
FIG. 11 (*a*) and (*b*) are plots of skin displacement over time for the x,y axes of an optical flow sensor as a result of surprise and frowning expressions, respectively.
Figure 11B:
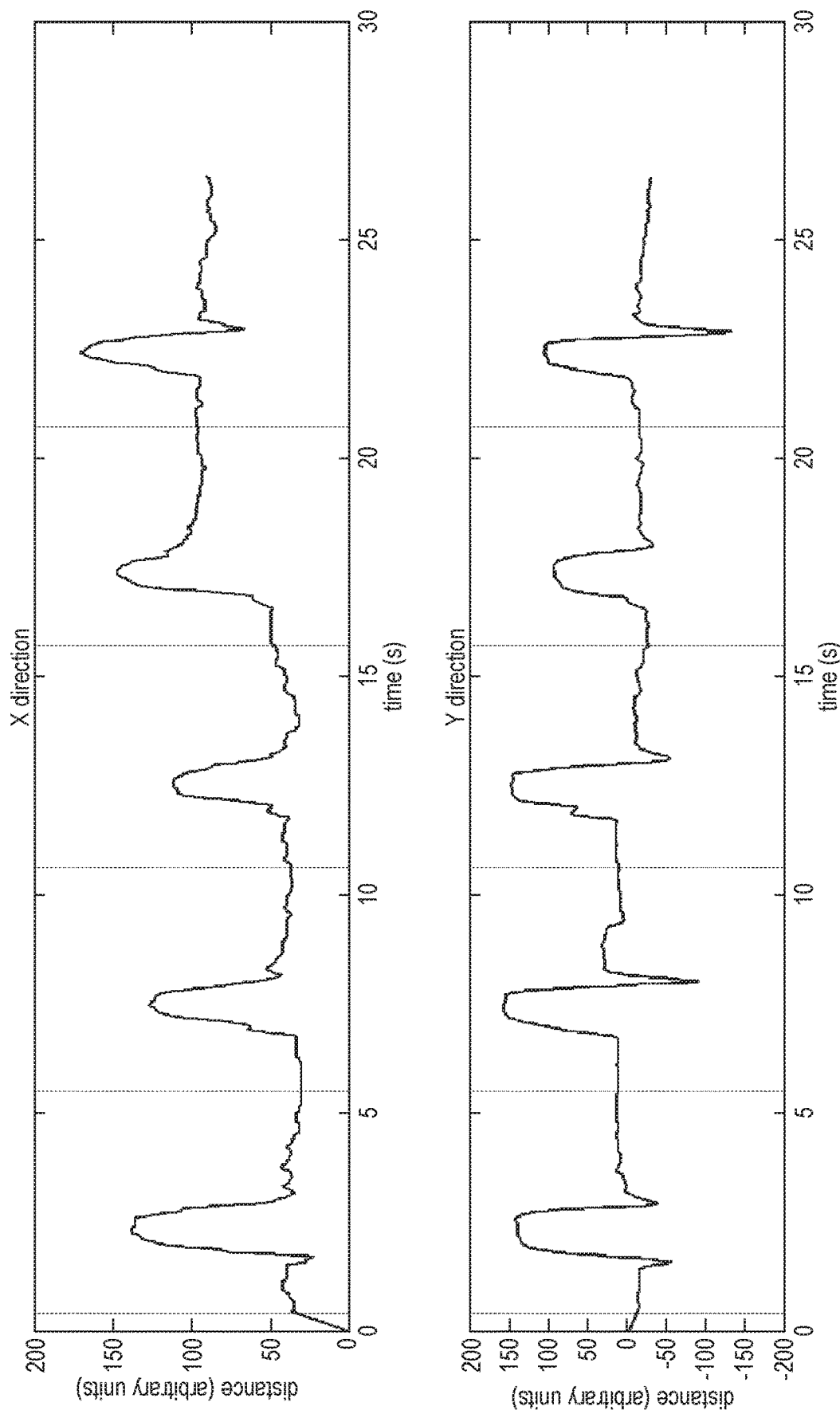

Examples of skin movement detected at area 401 in FIG. 4 by an optical flow sensor provided at location 301 at a pair of glasses is shown in FIG. 11 for the expressions illustrated in FIG. 7. In the pairs of plots shown in FIG. 11, the top plot of each pair shows skin movement over time in the x-direction and the bottom plot of each pair shows skin movement over time in the y-direction. The x,y axes are a pair of orthogonal axes defined for the imaging plane of the sensor as indicated in FIG. 1. The optical flow sensor is oriented at the glasses such that the imaging plane of the sensor is substantially parallel to the area of skin 401 being imaged, with the y-axis being oriented substantially parallel to the midline of the user and the x-axis being oriented substantially perpendicular to the midline (i.e. movements along the x-axis occur in a left-right direction across the forehead and movements along the y-axis occur in an up-down direction).

FIG. 11 (a) shows skin movement along the two axes when an expression of surprise is repeatedly made by the user. It can be seen that each time the expression is made, the skin at 401 moves along the x-axis towards the midline (lower x) and down the forehead in an inferior direction (lower y). This is due to contraction of the frontalis muscle.

FIG. 11 (*b*) shows skin movement along the two axes when a frowning expression is repeatedly made by the user. It can be seen that each time the expression is made, the skin at 401 moves along the x-axis away from the midline (higher x) and up the forehead in a superior direction (higher y). This is due to contraction of the depressor supercilii, procerus and corrugator supercilii muscles.

It will be appreciated that the two expressions can be readily distinguished from the differing skin movements of area 401.

The plots in FIG. 11 were captured using an ADNS-9800 optical flow sensor positioned at a distance of about 4 mm from the skin and configured to provide vector information describing detected skin movements relative to the x,y axes of the imaging plane of the sensor.

Whereas muscle activity is typically measured by a sensor located over the target muscle whose activity is to be measured, it can be advantageous to measure the activity of a muscle using an optical flow sensor located so as to detect skin movement associated with but not overlying the target muscle. Generally the optical flow sensor could be positioned anywhere over skin which moves as a result of the activity of the target muscle whose activity is to be monitored—e.g. as a result of an area of skin being displaced due to its connection to an adjacent area of skin overlying the target muscle. In some cases it can be advantageous to arrange a sensor to measure the skin movement overlying or associated with a muscle which is antagonistic to the target muscle whose activity is to be inferred.

Figure 13:
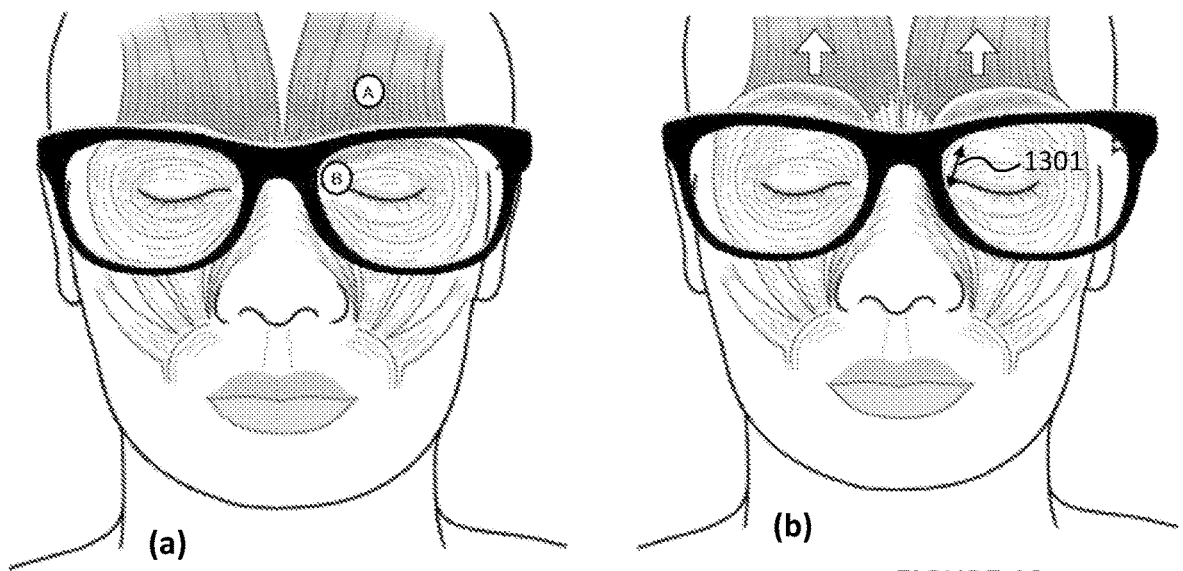
FIG. 13 illustrates the effect of elevation of the frontalis on the skin of the sub-brow region.

For example, FIG. 13 illustrates an advantageous sensor arrangement for measuring the activity of the frontalis muscle 'A' in which an optical flow sensor is arranged to detect the movement 1301 of skin in the sub-brow region 'B' which overlies an antagonistic muscle to the frontalis. The sub-brow region is that area on or below the supraorbital ridge and above the eye. An optical sensor in the sub-brow region detects stretching of the skin due to contraction of the frontalis muscle. This is illustrated in the two sub-figures (a) and (b): in (a) the frontalis muscle is relaxed and the skin in region 'B' is not stretched; in (b) the frontalis muscle has contracted, stretching the skin and causing movement 1301 which can be detected by a sensor located at 'B'. Location 'B' could correspond to a sensor 304 in FIG. 3.

Depending on the shape and size of the apparatus, such as the glasses shown in FIG. 3, sensors 301 (or their equivalent on other apparatus) may in fact be positioned so as to detect movement of skin in the sub-brow region rather than the movement of skin overlying the frontalis. The processor 208 may be configured to interpret elevation of the area of skin in the sub-brow region as activation of the frontalis muscle. In the manner described above this can enable the activity of the frontalis to be indirectly captured by optical flow sensors mounted on apparatus having a compact form factor which does not allow the direct measurement of skin movement overlying the frontalis.

Figure 14:
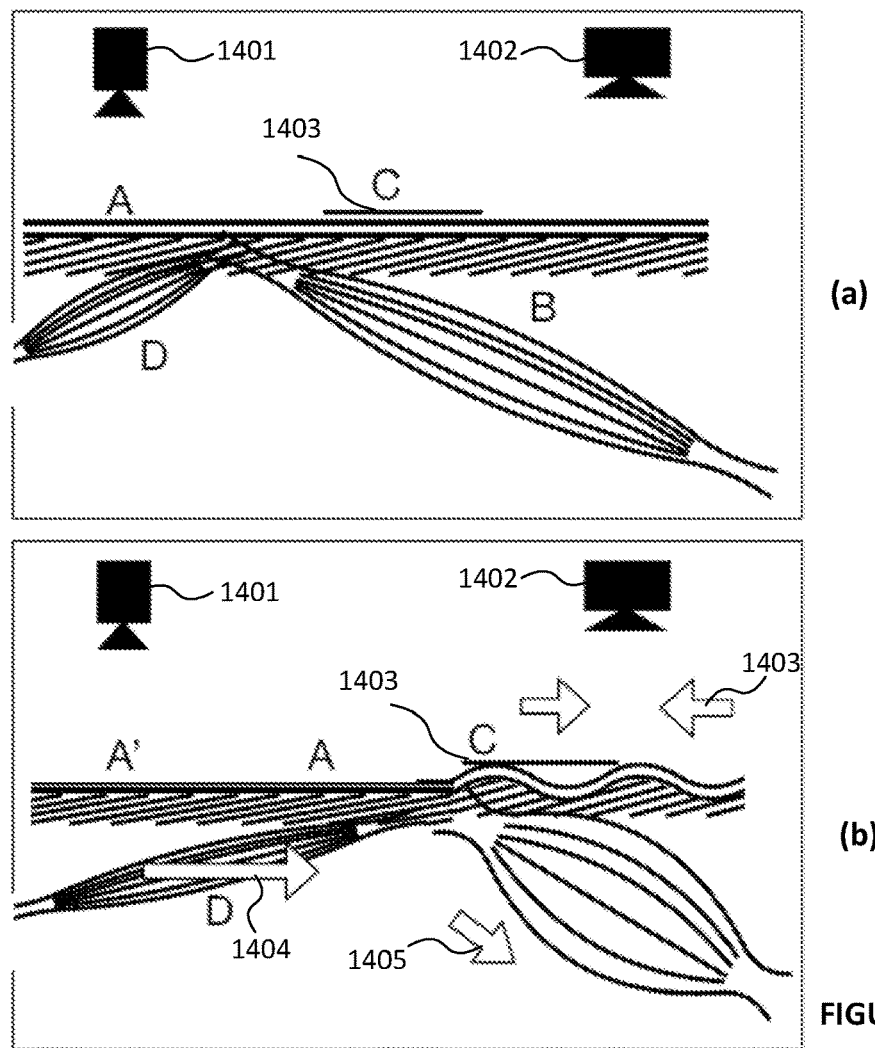
FIG. 14 shows advantageous combinations of sensors having a wide dynamic range.

FIG. 14 illustrates an advantageous combination of an optical flow sensor 1401 with one or both of a proximity sensor 1402 and electromyographic (EMG) sensor 1403 for detecting activity of an antagonistic muscle pair. For example the frontalis muscle pulls the eyebrows upwards and is antagonised by the corrugator supercilli, depressor supercilli, procerus and orbicularis oculi (especially pars lateralis). Similarly the levator muscle of the eyelid antagonises the orbicularis oculi and the muscles acting on the corner of the mouth (zygomaticus, levator labii) are antagonised by the orbicularis oris. The optical flow sensor 1401 is located over the antagonist muscle D and the proximity and/or EMG sensors are located over the target muscle B whose activity is to be measured and for which muscle D is its antagonist. As will now be described, the arrangement shown in FIG. 14 enables muscle activity to be measured over a wide dynamic range.

An EMG sensor is configured to measure the electrical activity of a muscle which typically presents prior to any visible changes at the skin overlying the muscle. EMG sensor 1403 enables the initial electrical signal that causes muscle B to contract to be detected at an early stage when there is minimal skin movement. As the contraction 1405 of muscle B develops and antagonist muscle D is stretched 1404, the optical flow sensor detects the consequent displacement of the skin overlying the antagonist muscle—as indicated by the movement of point A on the skin between images (a) and (b).

As the contraction becomes more forceful, the muscle contraction may be measured by proximity sensor 1402. The skin overlying muscle B bunches up 1403, changing the distance between the proximity sensor and the skin and hence allowing the sensor to detect the contraction.

Figure 15:
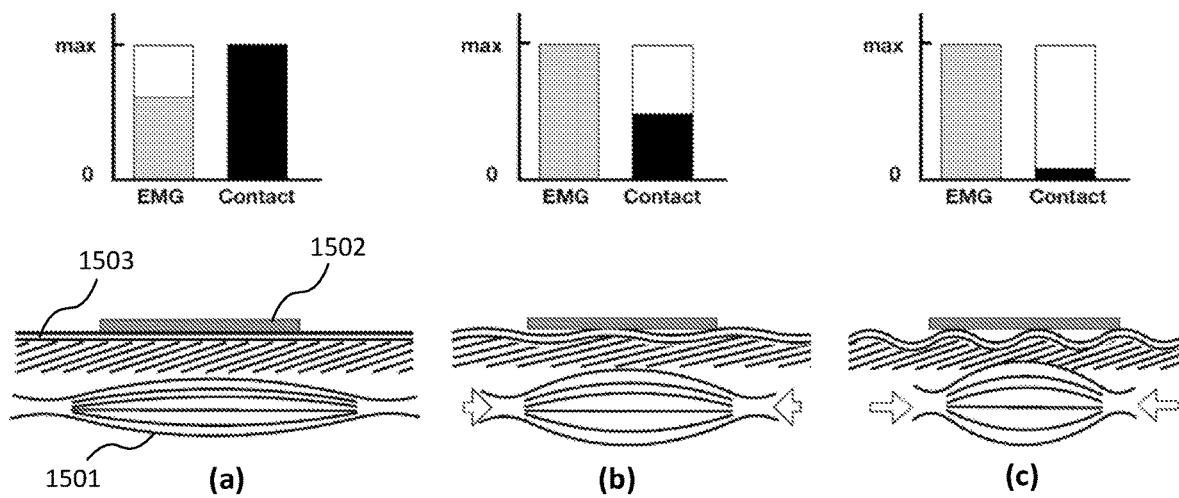
FIG. 15 illustrates the effect of varying degrees of muscle contraction on an EMG sensor.

As the skin bunches up the contact between the EMG sensor and skin may worsen. The change in skin contact of an EMG sensor as an underlying muscle contracts is illustrated in FIG. 15. Sub-figures (a) to (c) show the increasingly poor contact between an EMG sensor 1502 and skin 1503 as a muscle 1501 underlying the skin contracts with increasing force. At small contractions of muscle 1501 shown in (a) the contact is excellent but the EMG is intermediate because the electrical activity of the muscle is relatively low. As the contraction intensifies the EMG signal reaches a maximum in (b) with some contact being lost between the sensor and skin.

At large contractions of the muscle, the contact becomes poor as the skin bunches up under the sensor and the EMG signal is saturated by the high electrical activity of the muscle. Movement between the sensor and skin due to the motion of the skin caused by the muscle contraction may also introduce artefacts into the signal. In order to measure large muscle contractions it can therefore be useful to use other sensor types.

Combining an optical flow sensor with one or both of an EMG sensor and a proximity sensor can increase the range over which muscle activity can be measured. It can be difficult to detect small skin movements associated with small muscle contractions at an optical flow sensor because even under optimal conditions there will typically be low-level background motion between the apparatus at which the sensor is supported and the skin due to movements of the user. Typically it is advantageous to filter out such small movements detected by optical flow sensors. Combining an optical flow sensor with an EMG sensor enables small muscle contractions to be measured which would be lost in the noise of an optical flow sensor. Because an EMG sensor measures electrical muscle activity it can reliably detect small contractions that an optical flow sensor would not capture without also capturing skin movements that are not due to muscle activation and which would not present with associated electrical muscle activity.

In some situations, at high levels of muscle contraction an optical flow sensor may become saturated. For example, in FIG. 14, as the contraction of muscle B becomes more forceful, the area of skin imaged by the optical flow sensor 1401 may be pulled outside the range of view of the sensor—e.g. at the point when A' lies beneath the optical flow sensor as shown in image (b). It can be advantageous to measure large muscle contractions using a proximity sensor. It is typically difficult to detect small muscle activations with a proximity sensor since such activations do not cause significant skin movements out of the plane of the skin so as to modify the distance between the sensor and skin. However, the sensors are particularly suitable for measuring large activations when other types of sensors may become saturated and/or suffer from other problems. At large activations the skin overlying a muscle can bunch up, changing the distance between the proximity sensor and the skin. For facial muscles the degree of movement out of the plane often increases as the strength of contraction increases enabling a proximity sensor to measure the strength muscle contraction.

Figure 16:
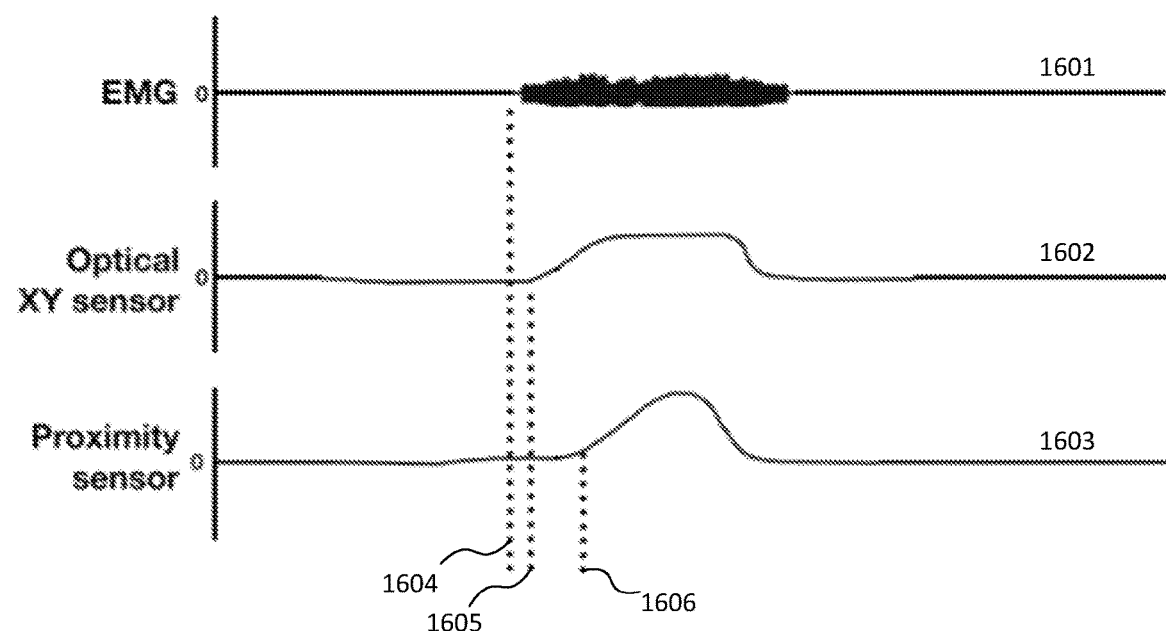
FIG. 16 illustrates the time-varying behavior of different types of sensors as a muscle activates with increasing strength and then progressively relaxes back to repose.

FIG. 16 illustrates the response of the various types of sensor to the activity of a target muscle whose activity is to be measured. In the example of FIG. 16 the target muscle is the corrugator muscle. The optical flow sensor would typically exhibit a similar response whether it is located directly over the target muscle or over an antagonistic muscle. FIG. 16 includes graphs showing real-time multi-modal sensing of the activity of a muscle for a combination of EMG, optical flow and proximity sensors. The horizontal scale indicates time and the vertical scale is in arbitrary units to which the component signals have been scaled.

It can be seen that the EMG sensor 1601 detects activation of the muscle at time 1604 before any of the other sensor types. Subsequently the optical flow sensor 1602 picks up the activation at time 1605, and finally the proximity sensor 1603 detects muscle activation at time 1606. It can be observed that the EMG signal 1601 and optical flow sensor signal 1602 both saturate before maximal muscle activation occurs but that the proximity sensor continues to provide a signal which is approximately proportional to the strength of activation of the muscle.

The multi-modal arrangement shown in FIG. 14 exploits the characteristics of the optical flow, EMG and/or proximity sensors so as to provide a combined sensor unit which has a very wide dynamic range. The signals from the two or more sensor types may be combined so as to provide a compound signal. Suitable scaling of the signals captured by each sensor type may be empirically determined for a given facial muscle. In combining the signals from the different sensors for a given muscle, the processor 208 may be configured to predominantly use the signal contribution from the sensor type which is best or better suited to the size of the muscle activity. For example, for large activations the processor may derive a compound signal reflecting the degree of activation of a muscle where the primary component is from the proximity sensor and the contributions from the optical flow and/or EMG sensor are damped or omitted so as to prevent the saturated, flat optical flow and/or EMG sensor dominating and concealing the variation expressed in the proximity sensor. At small activations the contribution from the EMG sensor may be promoted or selected over the other sensors. At intermediate activations the contribution from the optical flow sensor may be promoted or selected over the other sensors. Suitable points at which to switch between sensors or reduce the contribution of one sensor in favour of another may be determined empirically.

Thus wearable apparatus may include an EMG sensor and/or a proximity sensor arranged to detect the activity of a first muscle along with one of the plurality of optical flow sensors, and the processor being configured to combine, with the time-varying data captured by the optical flow sensor, time-varying data describing movement of the respective area of skin which is captured by the EMG sensor and/or the proximity sensor. At a given point in time, the processor may be configured to weight the time-varying data captured by the sensors according to the level of activity of the first muscle indicated one or more of the sensors. The processor may be configured to preferentially or advantageously weight the time-varying data captured by the EMG sensor at low activity levels of activity of the first muscle and the optical flow sensor at intermediate levels of activity of the first muscle, and/or preferentially or advantageously weight the time-varying data captured by the proximity sensor at high activity levels of activity of the first muscle and the optical flow sensor at intermediate levels of activity of the first muscle.

When most or all three sensor types are present the EMG sensor enables measurement of small muscle activations, the optical flow sensor provides accurate measurement of muscle activity for intermediate muscle activations, and a proximity sensor enables measurement of large muscle activations.

A proximity sensor could be, for example, a source of electromagnetic waves (e.g. infra-red, visible, UV, microwave, or terahertz) and/or acoustic waves (e.g. ultrasound) for emission towards the skin and a corresponding detector configured to receive electromagnetic and/or ultrasound waves reflected from the skin and determine the proximity of the skin to the sensor by measuring the amplitude and/or phase of the received signal. Alternatively or additionally the proximity sensor could be configured to emit the electromagnetic and/or acoustic waves with a predetermined pattern and determine the distance to the skin from the effect of distance travelled by the waves on the pattern (e.g. the spacing of non-collimated infra-red beams would vary with distance and allow a suitable sensor to estimate the distance travelled by the beams and hence the distance to the skin). Various other techniques suitable for estimating a distance of between a few millimeters to several centimeters are known in the art and it is envisaged that any such technique may be used according to the form factor of the apparatus and the particular facial muscle whose activity is to be measured.

Figure 17:
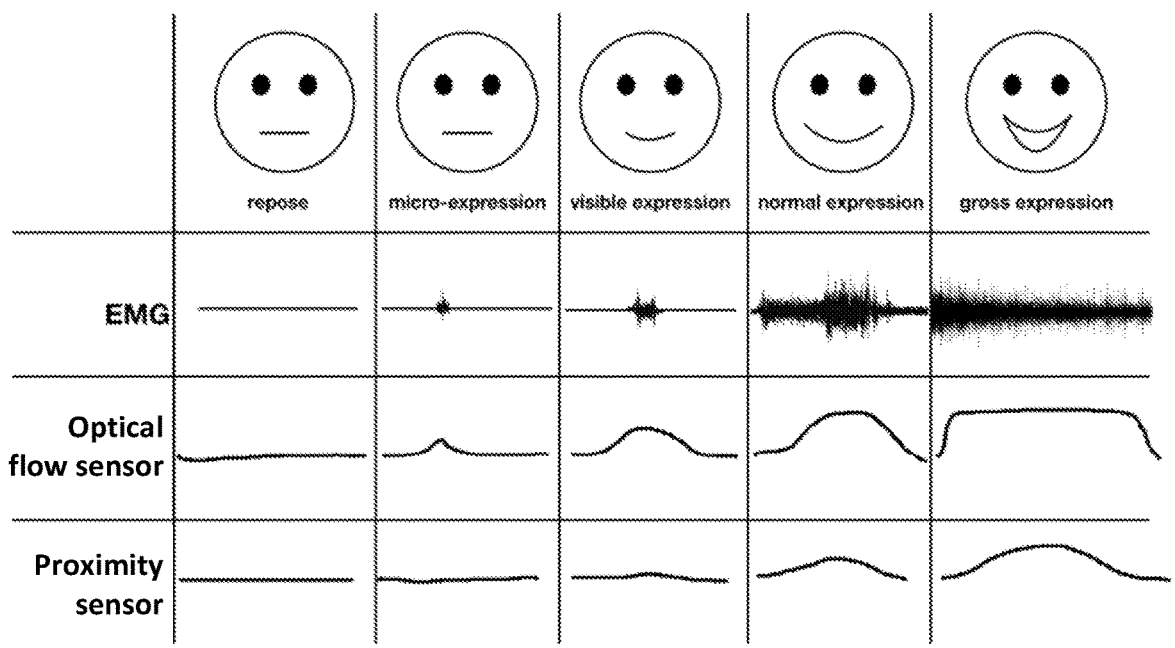
FIG. 17 illustrates the characteristics of the signals captured by different types of sensor in response to varying degrees of a smile expression.

FIG. 17 further illustrates the behavior of different sensor types for a smile expression as detected at the zygomaticus muscle at a range of muscle activation strengths. In repose, none or few of the sensor detect muscle activity. Brief micro-expressions may be captured by the EMG and possibly optical flow sensors. When a small visible expression or a normal expression is made both the EMG and optical flow sensors capture a clean signal proportional to the level of muscle activation. The proximity sensor will typically be able to detect an expression of normal strength. When a gross expression is made the EMG and optical flow sensors become saturated and the proximity sensor is the most useful for providing a signal proportional to the activity level of the target muscle.

An optical flow sensor may be additionally or alternatively configured to provide a series of images of the area of skin imaged by the sensor. The processor 208 or an external processing unit (e.g. a computer system) may perform optical flow processing on such a stream of images received from an optical flow sensor so as to itself determine vector information describing the movement of skin between frames. Processor 208 or an external processor may have greater processing power than processors 207. Performing optical flow processing at processor 208 could allow more complex optical flow processing to be performed, and may allow processors 207 to be omitted or of lower power (e.g.

performing signal processing and control of the sensor 206 and light source 205 but no substantive optical flow processing). Vector information determined at processor 208 or elsewhere may be used in any of the ways described above for vector information which may be generated by the optical flow sensors.

It can be advantageous to filter high frequency movements so as to remove noise resulting from, for example, vibrational movement of the wearable device and/or skin which are not due to muscle activity. For example, variations in the outputs which occur at a rate faster than, for example, 20 Hz, 10 Hz, 5 Hz, 2 Hz or 1 Hz may be attenuated by a low pass filter. Such filtering may be performed at the optical flow processor 207 of each optical flow sensor or at the processor 208 of system 200. For example, processor 207 or 208 may be configured to remove or attenuate variations in the magnitude and/or direction of vectors generated at the optical flow sensor which exceed some predetermined threshold. Vector signals generated at the optical flow sensors may be decomposed into their component frequencies by a Fast Fourier Transform (FFT) performed at or available to the respective processor.

An optical flow sensor as described herein is configured (e.g. though its location and orientation at the wearable apparatus) so as to detect skin movement in the plane of the skin (e.g. substantially in the x,y plane of the optical flow sensor indicated) rather than displacements out of the plane of the skin. An optical flow sensor may detect displacements out of the plane of the skin in addition to skin movement in the plane of the skin. Furthermore, an optical flow sensor is configured to sample a sufficiently small area of skin such that activity of the associated muscle causes translation in a common direction in the plane of the skin of a substantial part of the sampled area. The sampled area may be less than 100 square millimetres, less than 50 square millimetres, less than 25 square millimetres, less than 15 square millimetres, less than 10 square millimetres.

The use of optical sensors configured to sample small areas of the face at locations selected so as to ensure skin movements in the plane of the skin allows highly accurate detection of facial muscle activity at low power at a wearable device. Some embodiments described here do not suffer from the disadvantages associated with the related art. The processing requirements that may be necessary to identify optical flow of small areas of skin are substantially less than those that may be required to infer facial expressions from a video stream. The approach is substantially more computationally efficient than methods which a entire face in a video stream since may be only a relatively small amount of data need be collected from a small area of skin associated with the muscle of interest. In turn, the low computational complexity allows very high sampling rates to be achieved (e.g. in excess of hundreds or thousands of Hertz), enabling smooth tracking of facial muscle activity.

Optical flow sensors are compact and readily provided at wearable apparatus (e.g. a pair of glasses or VR headset) which can be worn whilst the user moves about, and which does not need to be large enough to capture the whole of the face of a user. Furthermore, the ability to locate optical flow sensors several millimetres from the skin enables the activity of muscles to be sampled which are difficult to engage with using sensors that may require contact to the skin overlying the muscle (e.g. electrical or strain-gauge sensors). For example, it is typically not possible to contact the zygomaticus muscle in the cheek using a conventional contact-based sensor mounted on the frame of a conventional-looking pair of glasses.

In examples, the optical flow sensor may include one or more of a single pixel sensor, an optical phased array capturing images of an area of skin without requiring an optical lens, an active depth sensing module that uses a pattern of projected light (e.g. infra-red light) to capture depth information such as displacements out of the plane of the skin. In examples, the optical flow sensor may be a radar sensor configured to track the movement of skin using microwave or terahertz electromagnetic waves rather than light in the visible, infra-red or ultra-violet spectra. In examples the optical flow sensor may be a lidar sensor configured to track the movement of skin using light in the visible, infra-red or ultra-violet spectra.

As used herein, a vector may be any kind of information describing magnitude and direction in any form. It need not imply a mathematical notation or information stored or expressed in any particular form.

The apparatus and system of FIGS. 1 and 2 are shown as including a number of functional blocks. This is schematic only and is not intended to define a strict division between different logic elements of such entities. Each functional block may be provided in any suitable manner. It is to be understood that intermediate values described herein as being formed by sensors or processors need not be physically generated by the sensor/processor at any point and may merely represent logical values which conveniently describe the processing performed by the sensor/processor between its input and output. The use of the term "image capture" need not imply that an image is formed or output by an optical flow processor and may refer generally to capturing contrast, texture or other information by an optical sensor which does not lead to an image being formed.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may include one or more processors.

The applicant hereby discloses in isolation each individual feature described herein and any combination of two or more such features, to the extent that such features or combinations are capable of being carried out based on the present specification as a whole in the light of the common general knowledge of a person of ordinary skill in the art, irrespective of whether such features or combinations of features solve any problems disclosed herein. In view of the foregoing description it will be evident to a person of ordinary skill in the art that various modifications may be made within the scope of some embodiments.

The invention claimed is:

1. A system for detecting facial muscle activity comprising:
    wearable apparatus comprising an optical flow sensors located so as to, in use when the apparatus is worn, image an area of skin associated with one or more facial muscles, the optical flow sensor being configured to capture time-varying data describing movement of the respective area of skin substantially in the plane of the imaged area of skin, wherein the optical flow sensor is configured to receive light from a plurality of areas of skin over one or more optical fibres; and
    wherein the wearable apparatus further comprises an optical switch configured to alternately provide light received from each of at least two of the plurality of areas of skin to the optical flow sensor, the optical switch being synchronised with the sampling rate of the optical flow sensor such that the optical flow sensor is configured to alternately sample different areas of skin.

2. The system as claimed in claim 1, wherein the optical flow sensors are located at the wearable apparatus so as to, in use when the apparatus is worn, image an area of skin overlying or adjacent to an insertion point of at least one of the one or more associated facial muscles.

3. The system as claimed in claim 1, further comprising a processor configured to process the time-varying data in dependence on a predetermined dataset relating facial muscle activity to movement of the areas of skin so as to determine activity of the facial muscles.

4. The system as claimed in claim 3, wherein the time-varying data comprises one or more of: vector information describing the magnitude and direction of movement of the area of skin; and a time series of images of the area of skin.

5. The system as claimed in claim 1, wherein the optical switch is configured to effect the switching using one or more liquid crystal filters or one or more controllable mirrors.

6. The system as claimed in claim 4, wherein the time-varying data comprises a time series of images and the processor is configured to process the time-varying data by identifying changes in texture in the images indicative of facial muscle activity according to the predetermined dataset.

7. The system as claimed in claim 3, wherein the processor is configured to determine activation of a facial muscle associated with an area of skin when the magnitude of movement of the area of skin in a predefined direction exceeds a predetermined threshold.

8. The system as claimed in claim 3, wherein the processor is configured to process time-varying data from the optical flow sensor so as to determine facial expression of the wearer of the wearable apparatus.

9. The system as claimed in claim 8, wherein the processor is configured to identify a facial expression when the magnitude and direction of movement detected at the optical flow sensor matches within predefined bounds a respective stored magnitude and direction of movement for the optical flow sensor for that facial expression.

10. The system as claimed in claim 9, wherein the system comprises a plurality of optical flow sensors each located so as to, in use when the apparatus is worn, image an area of skin associated with one or more facial muscles, wherein the processor is configured to, on identifying that two or more of the plurality of optical flow sensors capture substantially similar skin movements in both magnitude and direction, not determine a facial expression of the wearer of the wearable apparatus.

11. The system as claimed in claim 3, wherein the processor is configured to process the determined activity of the set of facial muscles so as to infer facial expression of the wearer of the wearable apparatus.

12. The system as claimed in claim 3, wherein the processor is provided at one or more of: the wearable apparatus and a device external to the wearable apparatus and configured to receive the time-varying data by a wired or wireless connection.

13. The system as claimed in claim 1, the wearable apparatus further comprising one or more lenses adapted to, in use when the apparatus is worn, focus light reflected from an area of skin onto the optical flow sensor.

14. The system as claimed in claim 1, the wearable apparatus comprising one or more light sources arranged to illuminate the areas of skin.

15. The A system as claimed in claim 1, wherein one or more of the light sources are configured to illuminate the at least two of the plurality of areas of skin synchronously with the sampling rate of the optical flow sensor.

16. The system as claimed in claim 1, wherein the wearable apparatus further comprises one or more first mirrors each configured to direct light reflected from the skin to the optical flow sensor.

17. The system as claimed in claim 3, wherein the wearable apparatus further comprises one or more motion sensors and the processor is configured to filter the time-varying data describing movement of the respective areas of skin in dependence on the output of the one or more motion sensors.

18. The system as claimed in claim 3, wherein the system comprises a plurality of optical flow sensors each located so as to, in use when the apparatus is worn, image an area of skin associated with one or more facial muscles and wherein the plurality of optical flow sensors includes an optical flow sensor arranged at the wearable apparatus so as to detect movement of an area of skin on or below the supraorbital ridge and the processor is configured to interpret elevation of that area of skin as activation of the frontalis muscle.

19. The system as claimed in claim 18, wherein, in use, no part of the wearable apparatus overlies the frontalis muscle.

20. A wearable apparatus for detecting facial skin movement comprising an optical flow sensor located so as to, in use when the apparatus is worn, image an area of skin associated with one or more facial muscles, the optical flow sensor being configured to capture time-varying data describing movement of the respective area of skin substantially in the plane of the imaged area of skin; and wherein the optical flow sensor is configured to receive light from a plurality of areas of skin over one or more optical fibres; and wherein the wearable apparatus further comprises an optical switch configured to alternately provide light received from each of at least two of the plurality of areas of skin to the optical flow sensor, the optical switch being synchronised with the sampling rate of the optical flow sensor such that the optical flow sensor is configured to alternately sample different areas of skin.

\* \* \* \* \*